US006580418B1

(12) United States Patent
Grome et al.

(10) Patent No.: US 6,580,418 B1
(45) Date of Patent: Jun. 17, 2003

(54) THREE DEGREE OF FREEDOM MECHANISM FOR INPUT DEVICES

(75) Inventors: Donald C. Grome, Edmonds, WA (US); Kurt T. Nielsen, Mukilteo, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/515,967

(22) Filed: Feb. 29, 2000

(51) Int. Cl.$^7$ ................................................. G09G 5/08
(52) U.S. Cl. ....................................................... 345/161
(58) Field of Search ................................. 345/161, 162, 345/163–167

(56) References Cited

U.S. PATENT DOCUMENTS

| | | | |
|---|---|---|---|
| 4,587,510 A | 5/1986 | Kim | 338/128 |
| 5,068,499 A | 11/1991 | Kuratani | 200/6 A |
| 5,107,080 A | 4/1992 | Rosen | 200/6 A |
| 5,164,722 A | 11/1992 | Laroze et al. | 341/20 |
| 5,436,640 A | 7/1995 | Reeves | 345/161 |
| 5,491,462 A | 2/1996 | Cecchi et al. | 338/128 |
| 5,661,253 A | 8/1997 | Aoki | 84/658 |
| 5,694,153 A | 12/1997 | Aoyagi et al. | 345/161 |
| 6,002,351 A | 12/1999 | Takeda et al. | 341/20 |
| 6,104,382 A | * 8/2000 | Martin et al. | 345/161 |
| 6,359,614 B1 | * 3/2002 | McVicar | 345/161 |

FOREIGN PATENT DOCUMENTS

| | | | |
|---|---|---|---|
| EP | 0936529 | 8/1999 | G05G/9/047 |
| FR | 2 340 573 | 9/1977 | G05D/1/00 |

\* cited by examiner

Primary Examiner—Steven Saras
Assistant Examiner—Uchendu O. Anyaso
(74) Attorney, Agent, or Firm—Ronald M. Anderson

(57) ABSTRACT

A joystick produces a control input signal in response to a pivotal displacement of a control handle about any of a plurality of axes. Corrected signals for each of orthogonal "X" and "Y" axes are provided in response to a pivotal displacement of the control handle about a center point disposed within a housing. Rotation of the control handle about the center point is enabled through use of a pair of members having spherical exterior surfaces sharing a common center. The member includes a hemispherical-shaped shell coupled to the control handle shaft, and an end cap defining a spherical surface disposed at the end of the control handle shaft. The control handle shaft extends into the housing through an opening defined in an upper portion of the housing. The opening provides a bearing surface adapted to slidingly engage the spherical upper surface of the hemispherical-shaped shell. The housing further includes a lower portion with a receiver adapted to slidingly engage the end cap. A pair of nested gimbals disposed in the housing are respectively rotated about the X and Y axes through engagement with the control handle shaft. Preferably, the joystick further provides a third input axis (the "Z" axis), about which the control handle is rotated to produce a control input signal. Rotation of the control handle about each of the X, Y, and Z axes is monitored by a corresponding potentiometer that is coupled to the gimbals and the control handle shaft. Torsion springs oppose displacement of the control handle about each of the X, Y, and Z axes and return the control handle to a center position, for each axis.

46 Claims, 15 Drawing Sheets

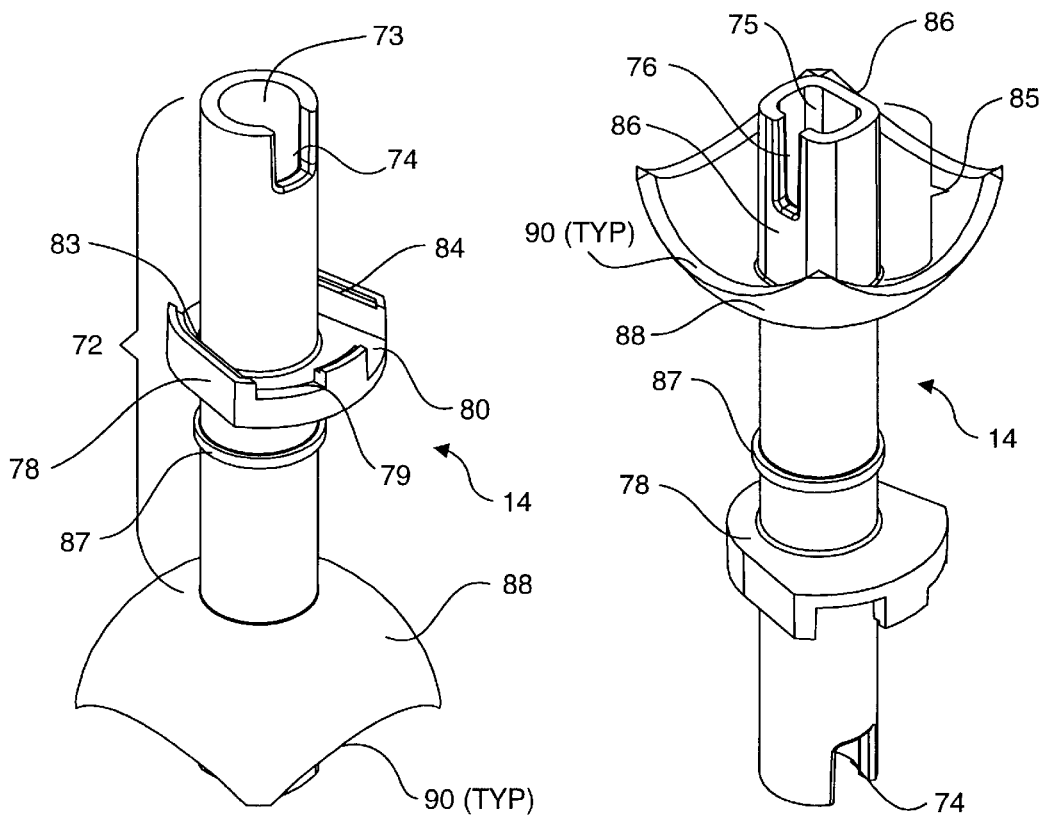
*FIG. 5A*     *FIG. 5B*

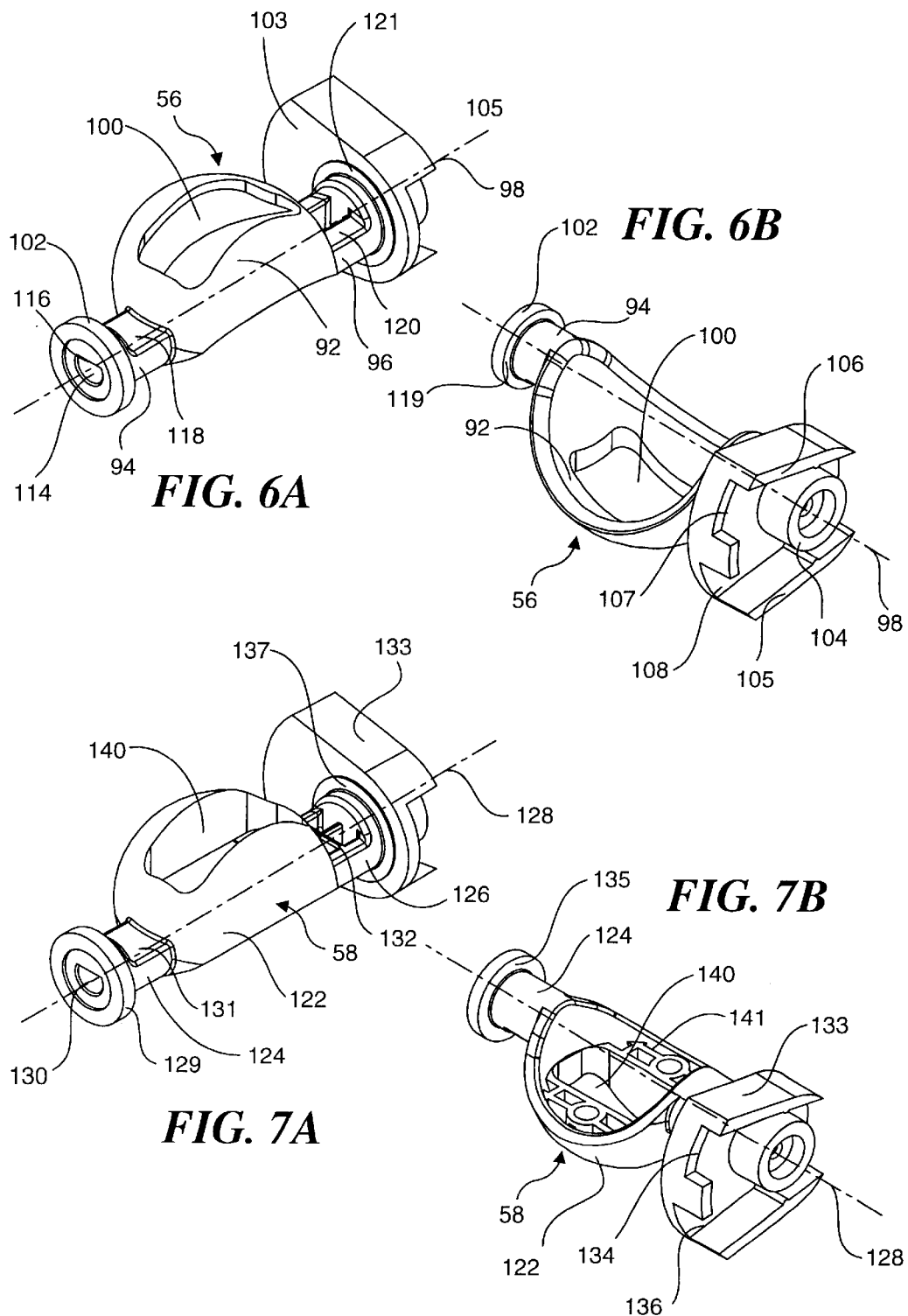

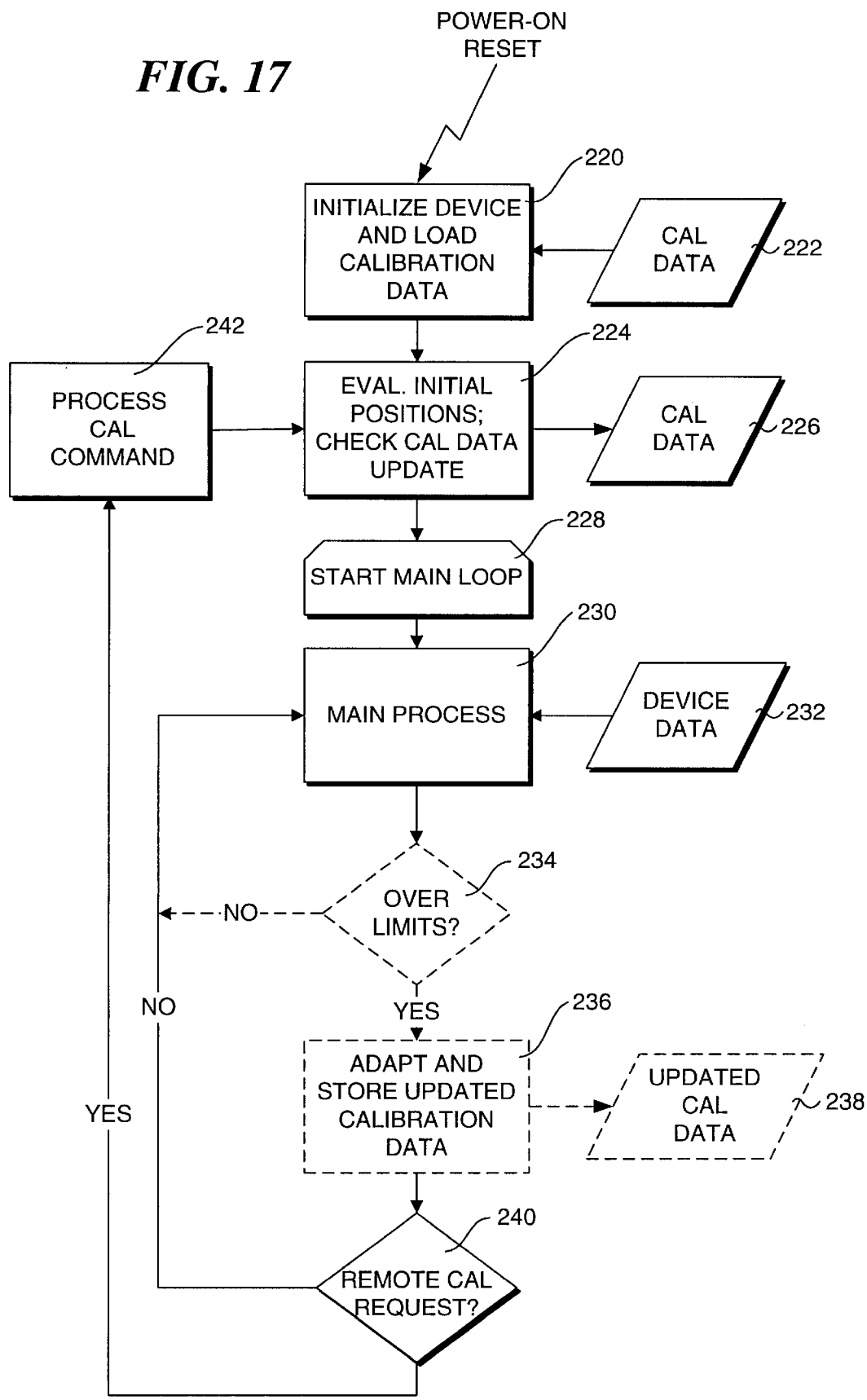

THREE DEGREE OF FREEDOM MECHANISM FOR INPUT DEVICES

FIELD OF THE INVENTION

The present invention generally concerns an input and control device, and more specifically, a joystick that provides control signals for controlling machinery, computer games, and the like.

BACKGROUND OF THE INVENTION

Joysticks are used to provide input control signals for controlling machinery and computer application programs, such as computer games. A typical joystick includes a handle that is pivotally rotatable about a base, producing an output signal corresponding to the angular displacement of the handle about orthogonal "X" and "Y" axes. It should be noted that movement of the joystick handle is sometimes referred to in terms of its motion in the direction of planar X and Y axes, rather than rotation about these axes. The output signal from a joystick is typically input to a receiving device, such as a computer, which processes the signal so that it may be used to control hardware or to provide a command input to a computer software program. For example, in a computer running an aircraft simulator program, a forward or reverse movement of the joystick's handle about the X axis causes an output signal to be generated that is used to control the elevators of the aircraft and thus affects the pitch of the aircraft, while lateral movement of the joystick about the Y axis produces a corresponding output signal that is used to control the ailerons, and thus affects roll or rotation of the aircraft about its longitudinal axis.

Joysticks are generally designed to function as either on/off devices or proportional devices. Lower-cost on/off devices only operate positional switches to provide an indication of whether a minimum displacement of the control handle about one or both axes of the joystick has occurred, whereas proportional devices provide output signals having a magnitude corresponding to a proportional displacement of the joystick control handle away from a known point, generally its "center" point. Higher-performance software applications, such as flight simulators, require the use of joysticks that provide proportional output signals.

In addition to providing X and Y axis input signals to a computer or other device, some joysticks additionally provide input signals corresponding to a third input axis, which is commonly referred to as the "Z" axis. The Z axis generally corresponds to the centerline of the joystick's control handle, and the Z axis output signal typically is indicative of a rotational angular displacement of the joystick handle about its centerline.

Many joysticks enable movement of the control handle about the X and Y axes through the use of a ball and socket configuration for mounting the control handle to a base. In this configuration, a ball is connected toward the lower end of the control handle shaft such that when a force is applied to the joystick's control handle, the ball is caused to rotate in the socket. In general, these devices provide a circular opening through which the control handle shaft extends. As a result, a simultaneous maximal displacement about both the X and Y axes is not possible, since the circular opening limits the simultaneous maximal displacement about both axes to be less than the maximal displacement about a single axis. Furthermore, in this type of configuration, is also not possible to rotate the joystick control handle through a full range of motion along one axis while maintaining the other axis at a maximal displacement. Accordingly, it would be beneficial to provide a joystick that does not have these limitations.

In general, most joysticks employ various electromechanical position sensors to measure rotation of the joystick control handle relative to its central position. In joysticks that employ the ball and socket configuration, the rotation of the control handle about (or linear displacement in the direction of) the X and Y axes are generally measured using electromechanical position sensors, such as rotary or linear potentiometers, optical encoders, linear displacement voltage transducers (LDVTs), etc., which are coupled to the shaft and/or ball in various ways.

Optical position sensors have also been employed for monitoring the position of a joystick control handle. For example, in U.S. Pat. No. 5,694,153, a joystick is disclosed that measures the position of X and Y axes, and rotation about the Z axis through use of a two-dimensional light-detecting element. A pair of light emitting diodes (LEDs) are mounted at an end of the joystick's control handle shaft and oriented toward the interior of the joystick's housing. The LEDs are strobed to alternately project light downwardly into the housing. A light detecting element, such as a two-dimensional position sensing device (PSD), two one-dimensional PSDs, or a four quadrant photodiode, is positioned opposite the LEDS, and mounted in the housing to receive the light from the LEDs, producing analog signals corresponding to the amount of light detected. The analog signals are converted to a digital format and input to a processor that employs a triangulation algorithm to determine the position of the joystick control handle relative to each of the X, Y, and Z axes. While this scheme produces an adequate measurement of displacement about these axes, the optical components and signal processing circuitry are relatively expensive. As a result, the cost to manufacture this type of joystick is greater than desired.

Durability is also an important feature for a joystick. It is very common for a user to apply significant forces to a joystick handle when playing games. The excessive force is due to a typical user's excitement during the game, when the user has a natural tendency to push the joystick handle harder in an attempt to achieve a faster or stronger response. The forces exerted by a user can be sufficient to damage the joystick control handle or its mount to the base. Therefore, it is desirable to provide a joystick with sufficient durability to minimize the risk of such damage.

SUMMARY OF THE INVENTION

In accord with the present invention, a joystick is provided that addresses many of the foregoing limitations in the prior art. Input signals are produced by the joystick for controlling computer software programs and hardware devices in response to a pivotal displacement of a joystick control handle about a center point relative to two orthogonal axes that pass through the center point referred to as the "X" and "Y" axes. Preferably, the device further provides a third input axis (the "Z" axis), about which rotation of a joystick control handle produces an input signal. The rotation about each axis is measured by separate position sensors that each produce a proportional output signal indicative of angular displacement of the control handle about a different one of these three axes. Springs that resists displacement of the joystick about each of the X, Y, and Z axes are also provided such that the joystick is automatically returned to a center position for each axis when input force on the joystick handle is removed.

The joystick includes a shaft extending from the control handle that is coupled to an end cap defining a spherical surface. In addition, a hemispherical-shaped member comprising a spherical exterior surface is coupled to the shaft adjacent towards a middle portion of the shaft. Preferably, the hemispherical-shaped member comprises a substantially hemispherical shell having four arcuate reliefs defined in respective quadrants of the shell. The shaft extends into an opening formed in a top portion of the housing. A bearing surface adapted to slidingly engage the spherical exterior surface of the hemispherical-shaped member as the joystick is pivoted is provided in the housing. A bottom portion of the housing, which is coupled to the top portion, includes a receiver adapted to slidingly engage the spherical surface of the end cap. Preferably, the spherical exterior surface of the hemispherical-shaped member and the spherical surface of the end cap are configured such that each of these surfaces share a common center point. Accordingly, movement by a user of the joystick control handle causes the control handle to be pivotally displaced about this common center point.

Preferably, the direction and magnitude of such a pivotal displacement can be determined by measuring a corresponding rotation about two orthogonal axes (the X and Y axes) that pass through the center point. Thus, a first position sensor and a second position sensor are operatively coupled to the control handle shaft so as to produce a signal that is proportional to an angular rotation of the joystick about the X and Y axes. The first and second position sensors preferably comprise potentiometers, so that a direction and a magnitude of the pivotal displacement of the joystick control handle can be readily determined as a function of output voltage signals produced by the potentiometers.

The potentiometers are operatively coupled to the shaft through gimbals. An upper gimbal is pivotally mounted to the housing and comprises a yoke connected at opposing ends to support shafts having a common centerline coincident with the X axis and a slot defined therein, parallel to the first axis through which the control handle shaft extends. The slot is also adapted to slidingly engage the control handle shaft such that the control handle shaft can freely rotate about the Y axis without causing the gimbal to rotate about the X axis. Preferably, the yoke includes a substantially hemispherical shell that is nested below the hemispherical member connected to the shaft of the joystick control handle. A substantially similar lower gimbal, having a substantially hemispherical yoke and an axis of rotation corresponding to the Y axis, is likewise pivotally mounted to the housing. The configuration of the upper and lower gimbals is such that the yoke of the lower gimbal is nested just below the upper gimbal and the gimbals rotate about orthogonal axes that share a common crossing point, preferably coincident with the center point discussed above. The yoke of the lower gimbal also has a slot defined therein, extending parallel to the Y axis through which the shaft of the joystick control handle extends and is adapted to slidingly engage this shaft, enabling the shaft to be rotated freely about the X axis without causing rotation of the lower gimbal about the Y axis.

Each of the upper and lower gimbals is operatively coupled to a spring that develops a bias force applied against the joystick control handle when the control handle is pivotally displaced away from the center position about the X and Y axes. Preferably, each of the springs comprises a torsion spring including a looped portion having a pair of tangs extending therefrom. The torsion spring is disposed in a holder and coupled to a support shaft on one of the gimbals. The holder and housing are configured such that when the joystick is in a centered position with respect to one of the X and Y axes, the tangs of the torsion spring corresponding to that one axis engage the housing and the holder in a manner that exerts no torque on the holder (and thus, no torque on the respective gimbal). However, rotation of the joystick in either direction about an axis of the gimbal causes a distance between the tangs to change such that one of the tangs exerts a force against the housing while the other tang exerts a force against the holder, thereby generating a torque opposite the direction of the rotation of the control handle about the gimbal axis. As a result, a bias force is produced that is exerted upon the control handle opposite the direction of its displacement.

The joystick is configured so as to enable a full range of motion to be traversed about one of the X and Y axes, while simultaneously enabling a user to maintain a maximal displacement about the other axis.

Rotation of the control handle about a third ("Z") axis, i.e., a longitudinal axis of the shaft by a user, produces a third input signal. Preferably, the shaft of the joystick control handle is prevented from rotating about this longitudinal axis by a flat formed on the shaft that engages the slots in at least one of the gimbals. A position sensor, preferably a potentiometer, produces a signal indicative of the angular position of the control handle as the control handle is rotated about its longitudinal axis. Preferably, the third axis also includes a spring configured in a manner substantially similar to the springs used for the X and Y axes, to provide a bias force to return the control handle to a center position about the Z axis when the joystick handle is rotated away from its center position. A force is exerted on the control handle by the spring to oppose rotation of the control handle by a user.

Electronic circuitry in the joystick include a memory in which is stored calibration data used for correcting offsets and scaling errors in the output signals produced by the joystick without requiring a user to perform a calibration process. Additionally, the electronic circuitry recalibrates the control signals in the event of component wear and enables positive identification of each different joystick if a plurality of identical joysticks are connected to the same Universal Serial Bus (USB) port on a computer.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIGS. 5A and 5B are isometric detail drawings respectively showing a topside and underside of the control handle shaft;

FIGS. 6A and 6B are isometric detail drawings respectively showing a topside and underside of the upper gimbal;

FIGS. 7A and 7B are isometric detail drawings respectively showing a topside and underside of the lower gimbal;

FIG. 17 is a flow chart illustrating the logic implemented by the electronic circuitry during operation of the joystick.

DESCRIPTION OF THE PREFERRED EMBODIMENT

Figure 1:
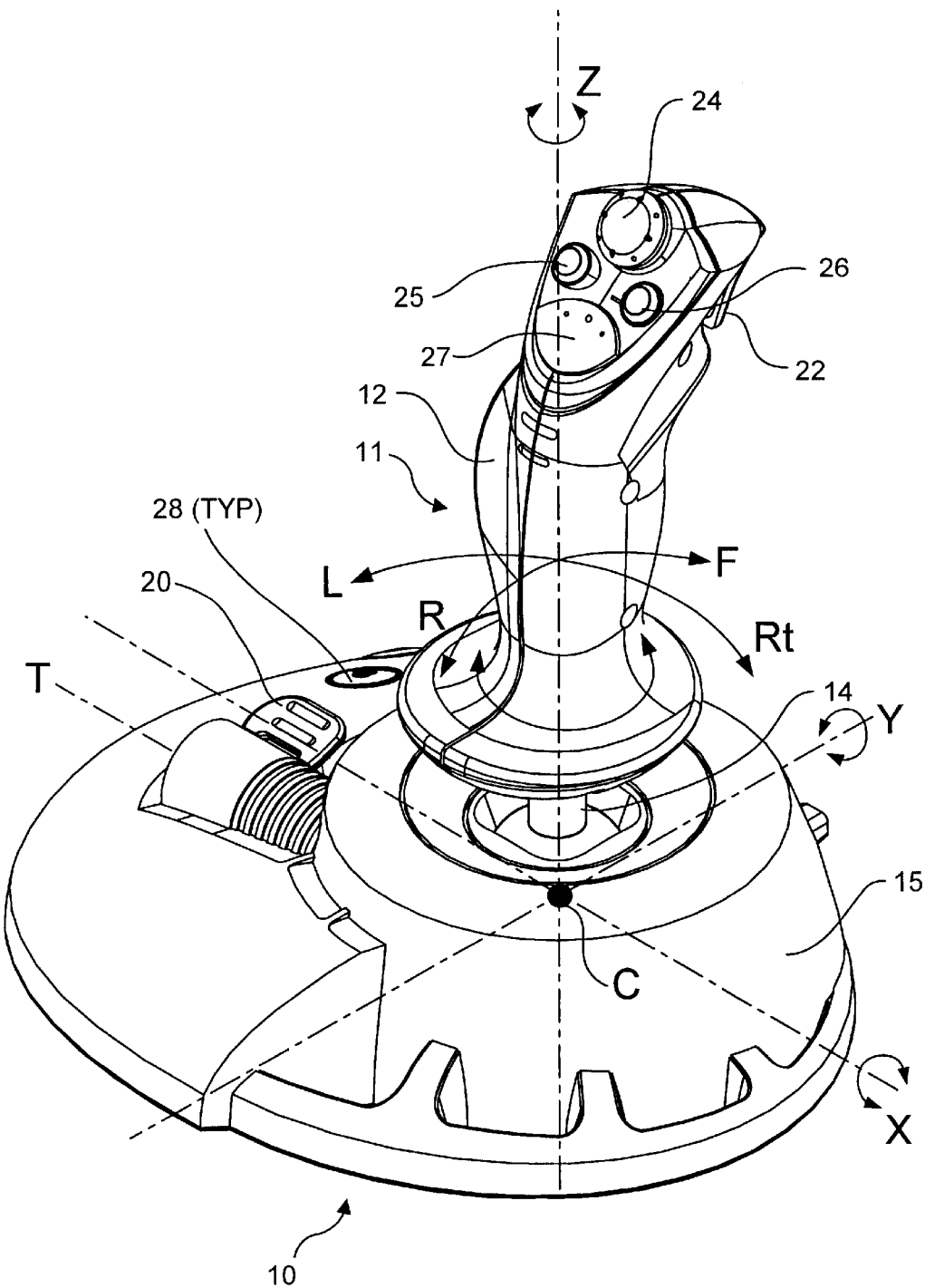
FIG. 1 is a rear isometric view of a joystick according to the present invention.
Figure 2:
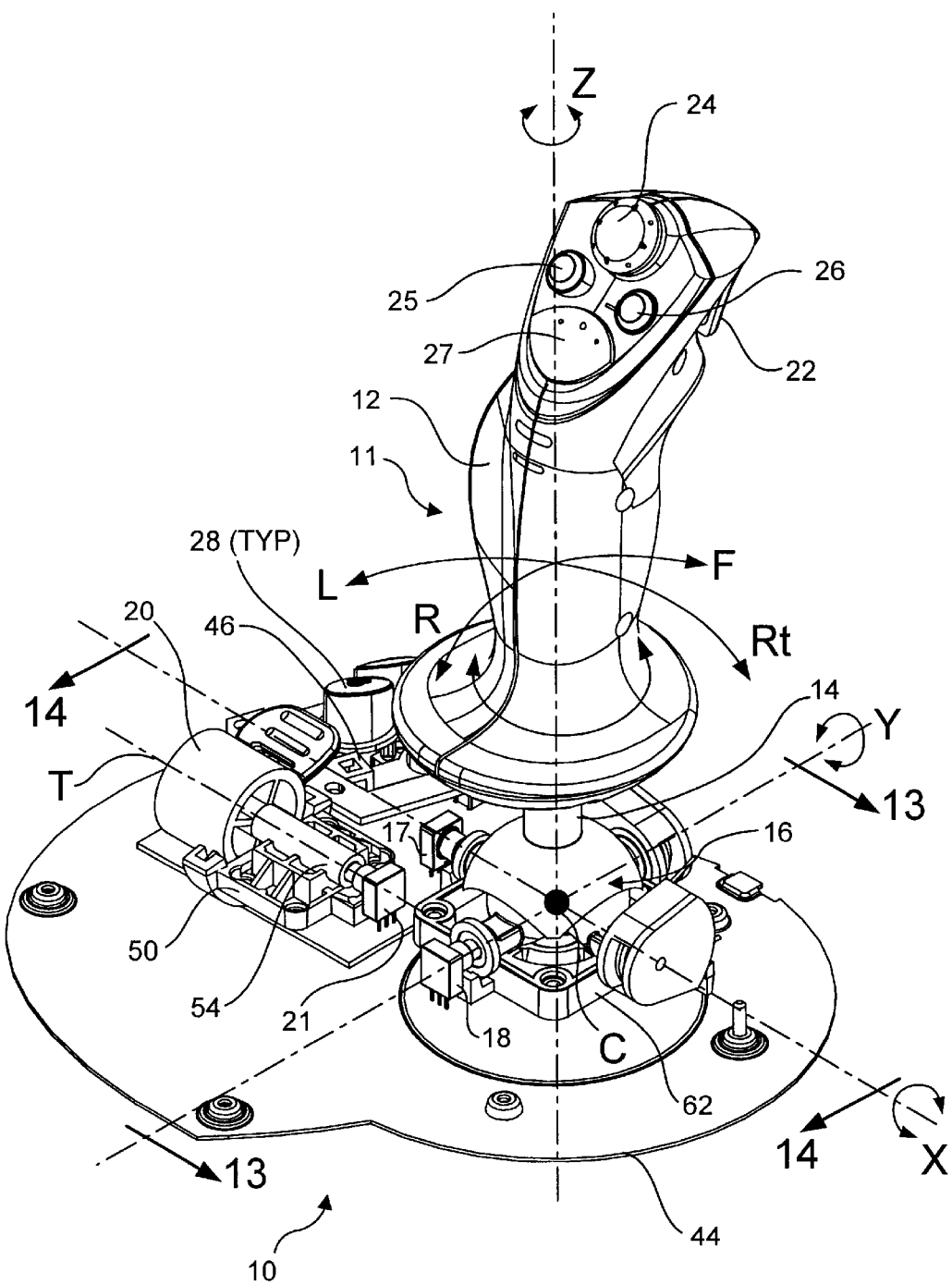
FIG. 2 is a rear isometric view of the joystick of FIG. 1, with the upper housing removed.

With reference to FIGS. 1 and 2, a preferred embodiment of a joystick 10 in accordance with the present invention enables a user to control three proportional input signals to a computer game or machinery by pivotal displacement of a control handle 12 about a pair of orthogonal axes, labeled "X" and "Y," and rotational displacement of control handle 12 about a third axis, labeled "Z," which is coincident with the centerline of a control handle shaft 14. A lower portion of control handle shaft 14 is pivotally mounted within a housing 15 of the joystick by means of a ball and socket mechanism to enable pivotal displacement of the control handle about a center point C. Control handle shaft 14 is coupled to a gimbal assembly 16. In addition, control handle 12 is pivotally mounted to control handle shaft 14 so as to enable rotation of the control handle about the Z axis, which is coincident with the centerline of the control handle shaft. The rotation of the control handle about each of the X, Y, and Z axes is measured by respective potentiometers 17, 18, and 19 (see FIG. 3), each of which produces a proportional output signal corresponding to a magnitude of the displacement of the control handle about a different one of these three axes.

In FIGS. 1 and 2, joystick 10 is shown in a rear quarter view, relative to the perspective of a user. In these Figures, moving control handle 12 in a forward direction "F" produces a clockwise rotation of the control handle about the X axis, while moving the control handle in a reverse direction "R" (i.e., toward the user) produces a counter-clockwise rotation of the control handle about the X axis. In a similar manner, moving the control handle toward the right (designated by "RT") produces a clockwise rotation of the control handle about the Y axis, while moving the control handle toward the left produces a counter-clockwise rotation about the Y axis. Rotation of control handle 12 about the central axis of control handle shaft 14 in either the clockwise or counter-clockwise direction corresponds to the rotation of the control handle about the Z axis.

In addition to the foregoing proportional control signals, joystick 10 also enables a user to provide an additional proportional input control signal through displacement of a throttle lever 20 that is pivotally mounted within housing 16 and coupled to a potentiometer 21, which produces an output signal indicative of the displacement of the throttle lever about a throttle axis T. Further "on/off"-type control signals are produced in response to user interaction with a plurality of control switches/buttons, that are operatively coupled to an upper portion of control handle 12, including a trigger switch 22, an 8-way point of view (POV) switch 24, and control buttons 25, 26 and 27. In addition, the joystick may also enable a user to produce selective input signals by actuating any of a plurality of base action buttons 28 (only one of which is shown) mounted within front portion of housing 16.

Figure 3:
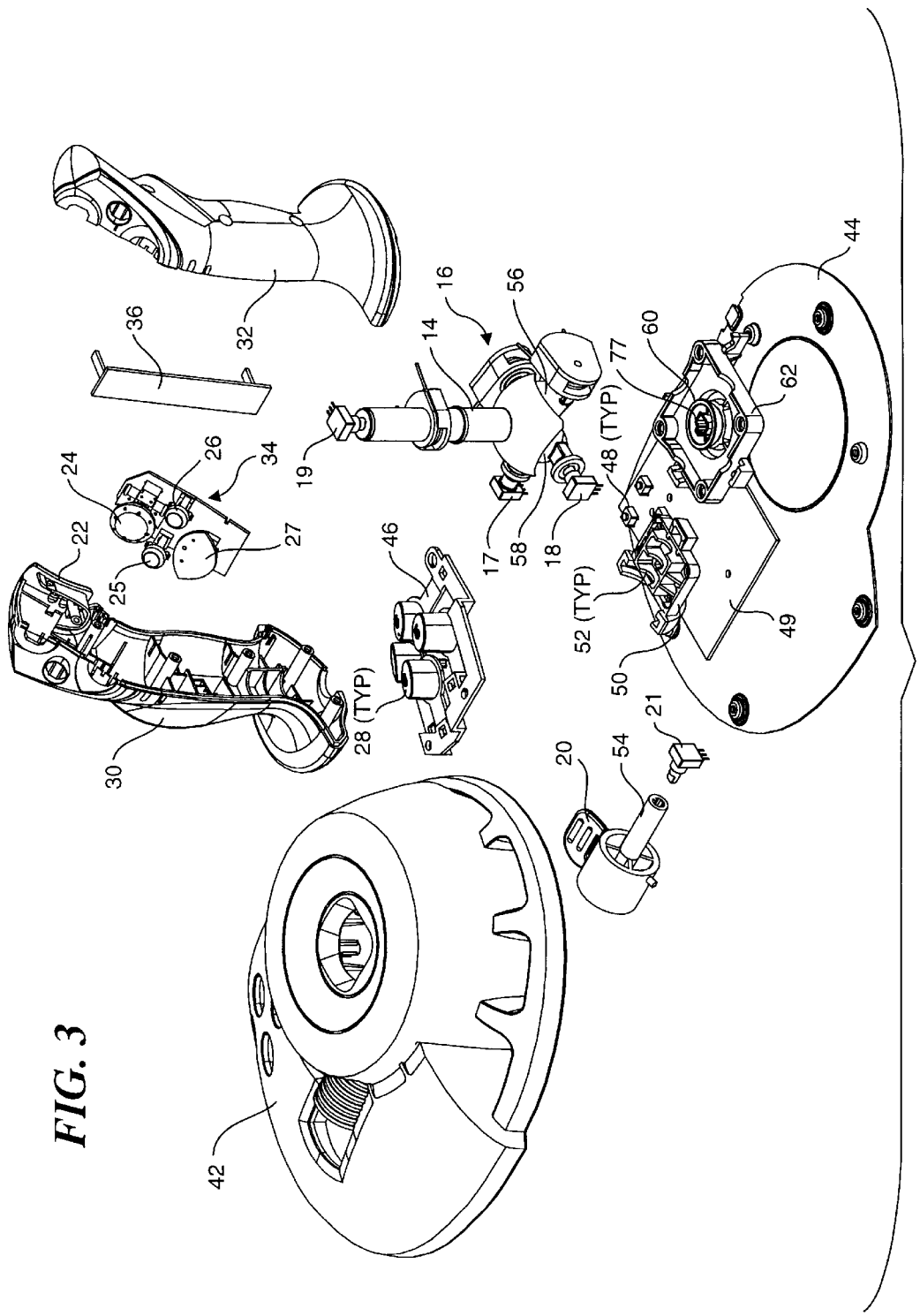
FIG. 3 is an exploded assembly view showing the primary components and sub-assemblies of the joystick.
Figure 4:
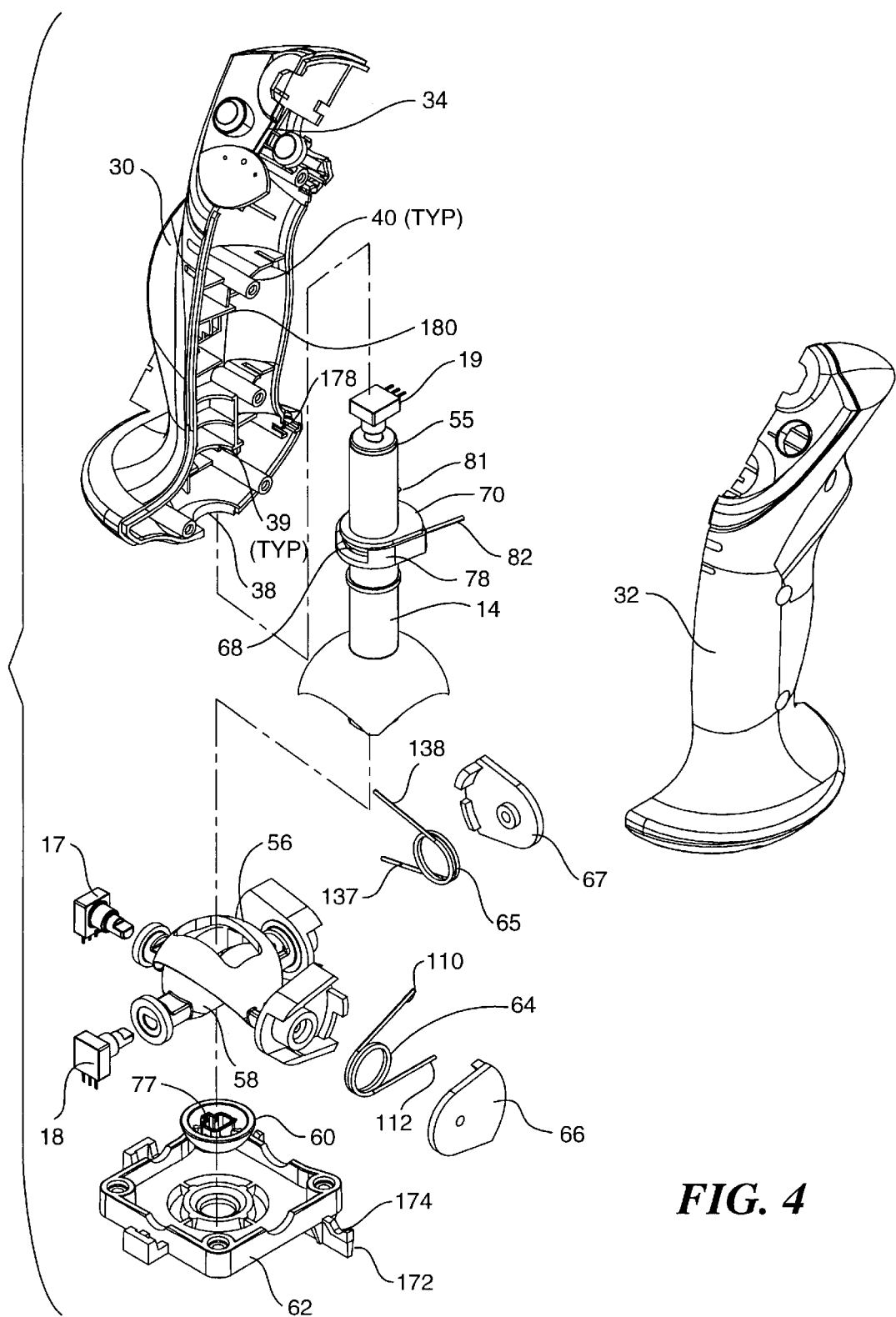
FIG. 4 is an exploded assembly view showing the primary components of the joystick and gimbal assembly of the joystick.

With reference to FIGS. 3 and 4, control handle 12 includes a left shell 30, a right shell 32, a control switch/button assembly 34, and a circuit board 36. Each of the left and right shells of the control handle include a plurality of bearing surfaces 38, 39 that are sized to mate with control handle shaft 14 upon assembly of control handle 12 with the control handle shaft, which is facilitated by means of a plurality of screws (not shown) that are threaded into respective holes disposed in a plurality of bosses 40 within the control handle.

As shown in FIG. 3, housing 15 includes an upper housing 42, and a base 44, which are fixedly joined with a plurality of screws (not shown). Base 44 is preferably made of metal to add weight to increase the stability of the joystick. A base action button assembly 46 comprising four base action buttons 28 is nested within upper housing 42 such that a vertical displacement of each base action button 28 causes a respective control switch 48 mounted to a circuit board 49 coupled to base 44 to be activated. A lower throttle housing 50, which is mounted to the underside of top housing 42, includes a plurality of bearing surfaces 52 defined therein that are adapted to mate with a shaft 54 extending from throttle lever 20.

With reference to FIG. 4, the primary components of gimbal assembly 16 include control handle shaft 14, an upper gimbal 56 coupled to X axis potentiometer 17, a lower gimbal 58 coupled to Y axis potentiometer 18, an end cap 60 coupled to a lower portion of control handle shaft 14, and a lower housing 62. The gimbal assembly further comprises respective torsion springs 64, 65 and torsion spring cover 66, 67 corresponding to each of the upper and lower gimbals.

FIG. 4 also illustrates the primary components that enable rotation of control handle 12 about the Z axis and measurement of that rotation. These components include control handle shaft 14, which is coupled to Z axis potentiometer 19 by a cap 55. Torsion spring 68 is operatively coupled between control handle shaft 14 and control handle 12, and is secured by a torsion spring cover 70 that is coupled to control handle shaft 14. Torsion springs 64, 65, and 68 respectively resist displacement of the control handle about the X, Y, and Z axes. Preferably, the amount of resistance provided by the torsion springs is proportional to the magnitude of the displacement about each axis, i.e., a maximum displacement results in a maximum bias force to restore the control handle to its center position, and a zero displacement of the control handle relative to its center position corresponding to each axis results in no biasing force being applied. These torsion springs thus automatically return the control handle to the center position for each axis when the force pivoting or rotating the control handle that was applied by the user is removed.

A detailed view of control handle shaft 14 is shown in FIGS. 5A and 5B. Control handle shaft 14 comprises a hollow shaft that is substantially concentric along an upper portion 72 thereof. An opening 73 disposed at the top of the shaft is sized to fixedly couple to a shoulder extending under cap 55 (not shown). The top of the shaft further comprises a slot 74 defined in a sidewall of the shaft. As shown in FIG. 5B, the concentric configuration of control handle shaft 14 is foreshortened in a lower portion 85 of the control handle shaft, so as to form a pair of flats 86, wherein an oblong opening 75 is defined in one flats 86. In addition, a slot 76 is defined in one of the flatted sidewalls of the shaft. Oblong opening 75 and slot 76 are configured to secure end cap 60 by engagement with a hollow protrusion 77 extending upwardly from the end cap (see FIG. 3). Slots 74 and 76 and the cavity that extends through the control handle shaft provide a route for lead wires that extend downwardly from potentiometer 19, trigger switch 22, 8-way POV switch 24, and control buttons 25, 26 and 27. These lead wires extend through the control handle shaft, exiting its bottom end, into the housing.

A torsion spring holder 78 is integrally formed in a middle portion of control handle shaft 14. The torsion spring holder captures torsion spring 68, which is disposed around the circumference of the shaft. Torsion spring holder 78 includes a pair of slots 79 and 80 through which respective tangs 81 and 82 of torsion spring 68 extend and a pair of protrusions 83 and 84 disposed on opposing sides of the interior of the holder. These protrusions are designed to engage torsion spring cover 70 such that torsion spring cover 70 snaps together with torsion spring holder 78 upon assembly. Further details regarding interaction of the torsion spring holder, torsion spring, and the control handle when the control handle is rotated about the Z axis are described below. Just below torsion spring holder 78 is a shoulder 87.

As discussed above, a ball and socket assembly enables pivotal displacement of control handle 12 about the X and Y axes. An upper portion of the "ball" is provided by a hemispherical member 88, which has a spherical upper surface coupled to the lower end of the control handle shaft. The lower portion of the ball is provided by end cap 60. Around the perimeter of hemispherical member 88 are defined a plurality of arcuate reliefs 90, the purpose of which is explained below.

With reference to FIGS. 6A and 6B, upper gimbal 56 comprises a substantially hemispherical yoke 92 having a pair of opposed support shafts 94 and 96 extending therefrom that share a common centerline 98. This centerline is coincident with the X axis when the joystick is assembled. A shoulder 102 is defined toward the end of support shaft 94, and a torsion spring holder 103 that is substantially similar to torsion spring holder 78, which was discussed above, is disposed adjacent to the outer end of support shaft 96. As shown in FIG. 6A, a slot 114 having a circular shape with a flat 116 on one side is defined in the end of support shaft 94, for receiving the input shaft of X axis potentiometer 17. Each of support shafts 94 and 96 further include respective flats 118 and 120 and respective adjacent bearing surfaces 119 and 121. In addition, a substantially rectangular slot 100 having a longitudinal axis that is parallel to centerline 98 extends through a middle portion of hemispherical yoke 92. Slot 100 is sized to receive lower portion 85 of control handle shaft 14 such that a pair of the flats 86 on the control handle shaft slidingly engage the slot.

Torsion spring holder 103 includes a hub 104, around which the windings of torsion spring 64 are disposed, and opposing sidewalls 105 and 106, which are respectively engaged by tangs 110 and 112 of torsion spring 64. Torsion spring holder 103 further includes a pair of slots 107 and 108, through which tangs 110 and 112 respectfully extend.

Lower gimbal 58 is substantially similar in configuration to upper gimbal 56. With reference to FIGS. 7A and 7B, lower gimbal 58 comprises a substantially hemispherical yoke 122, connected at opposing ends to support shafts 124 and 126, along a common centerline 128 that is coincident with the Y axis upon assembly of the joystick. A shoulder 129 is disposed adjacent to the end of support shaft 124, while a slot 130 substantially similar to slot 114 is defined in the end of support shaft 124 so as to enable coupling of Y axis potentiometer 18 to the lower gimbal. Support shafts 124 and 126 also include respective flats 131 and 132, respectively, and respective bearing surfaces 135 and 137. A torsion spring holder 133 that is substantially similar to torsion spring holder 103 is disposed adjacent to the end of support shaft 126. Torsion spring holder 133 includes a pair of slots 134 and 136 through which, respectively, tangs 137 and 138 of torsion spring 65 extend.

Hemispherical yoke 122 includes a rectangular slot 140 having a longitudinal axis that is generally parallel with centerline 128 and which is adapted to receive and slidingly engage lower portion 85 of control handle shaft 14. Hemispherical yoke 92 also preferably includes structural webbing 141 to increase the rigidity of the hemispherical yoke and to resist twisting of control handle shaft 14.

Upper gimbal 56 and lower gimbal 58 are preferably each formed of an acetal plastic, such as DELRIN™ plastic, although other plastics with low-friction surfaces may also be used. Furthermore, the gimbals are preferably formed by an injection molding process, although other plastic forming techniques may alternatively be used.

Figure 8A:
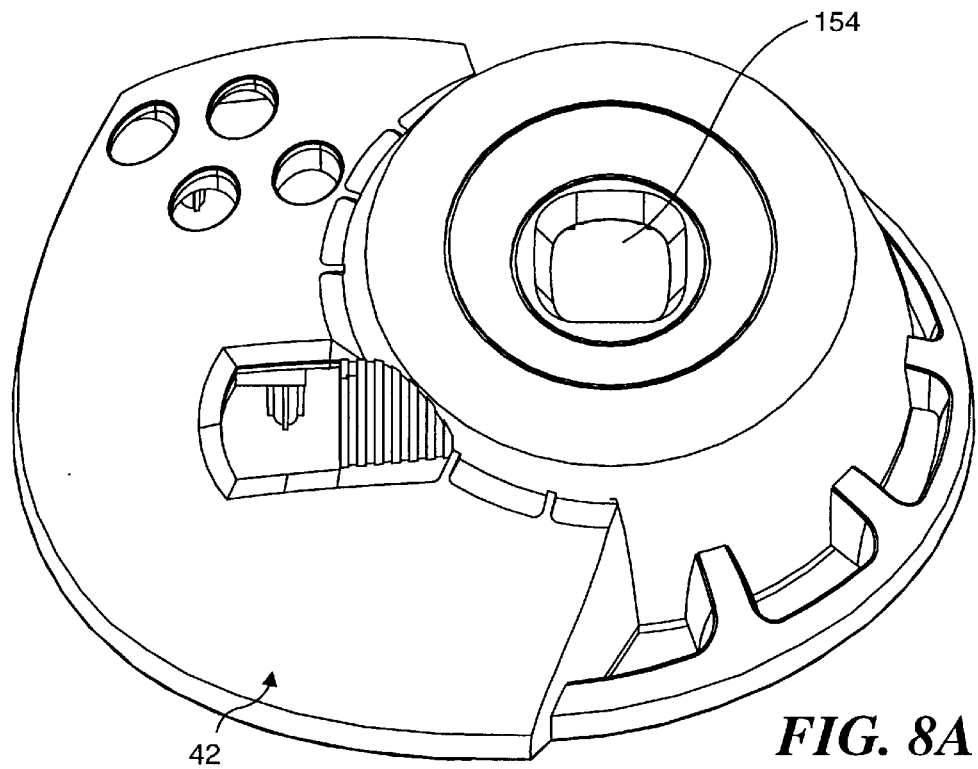
FIGS. 8A and 8B are isometric detail drawings respectively showing a topside and underside of the upper housing.
Figure 8B:
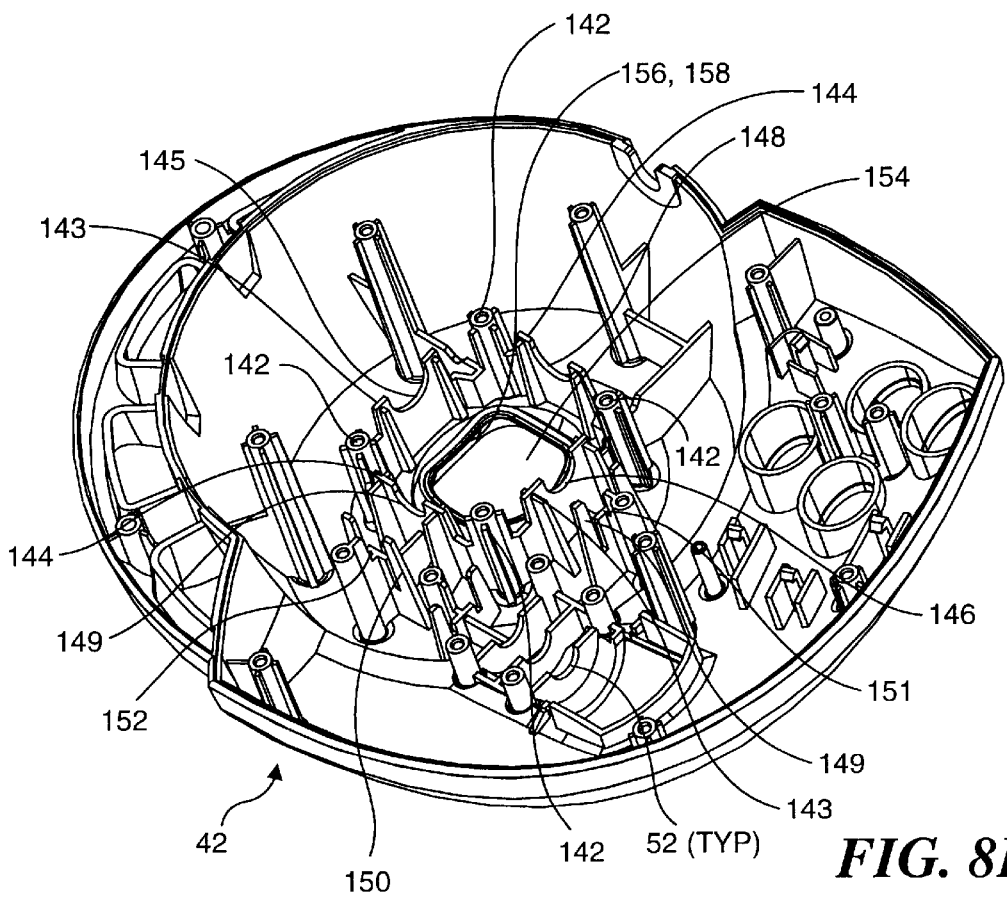

A detailed view of the underside of upper housing 42 is shown in FIG. 8B. Upper housing 42 includes four bosses 142 that are preferably arranged in a square configuration. Upper gimbal 56 and lower gimbal 58 are pivotally mounted to the upper housing by a pair of upper trunnion mounts respectively comprising orthogonal sets of tabs 143 and 144, which extend from the upper housing. A first set of bearing surfaces 145 and 146 are defined in tabs 143 so as to mate, respectively, with shafts 96 and 94 of upper gimbal 56. A second set of bearing surfaces 147 and 148 are defined in tabs 144 so as to mate, respectively, with shafts 124 and 126 of lower gimbal 58.

Figure 9:
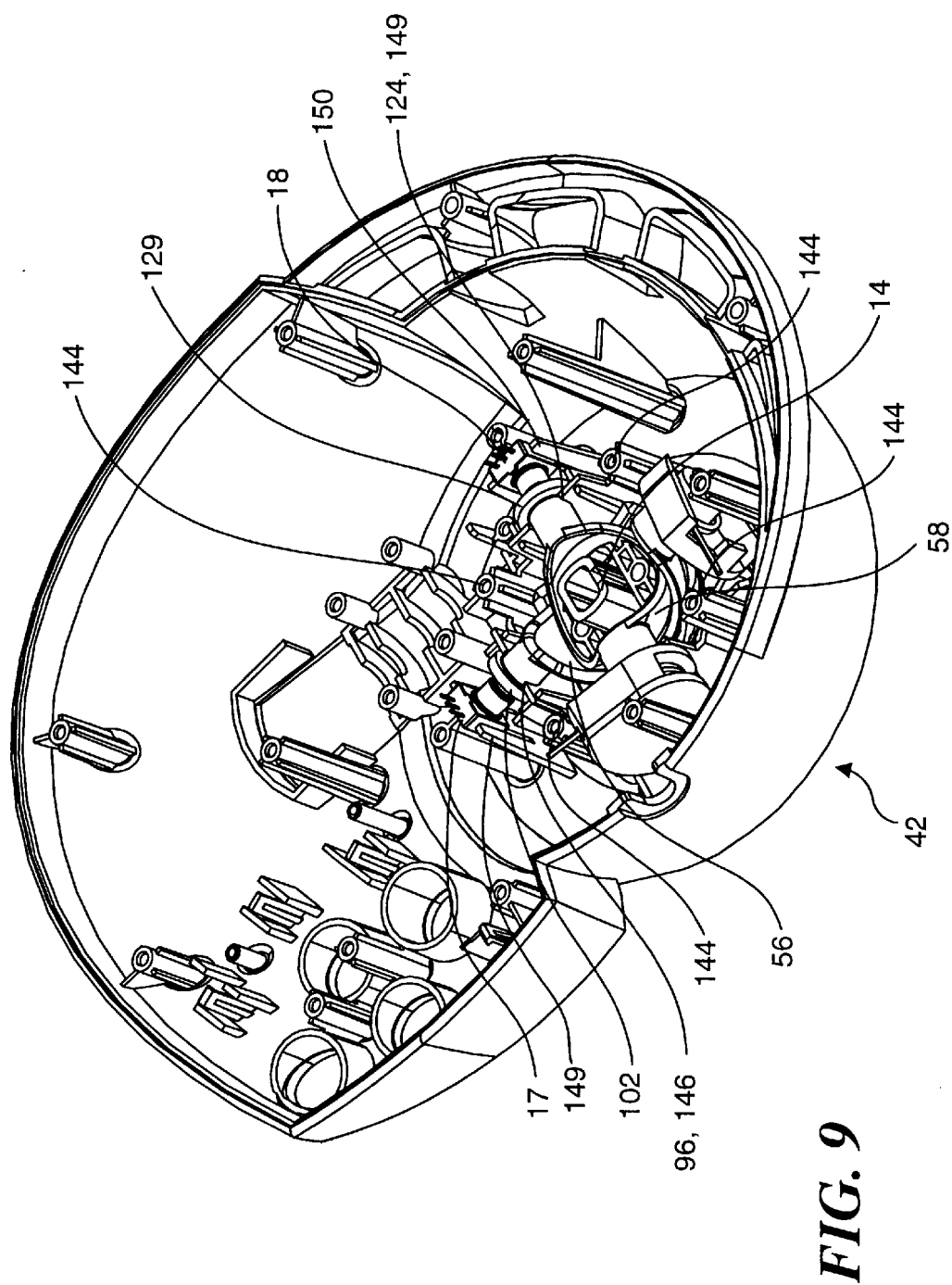
FIG. 9 is an isometric view of the underside of the joystick with the base and bottom housing removed.

Upper housing 42 further includes a pair of tabs 149 and 150 that are respectively parallel to tabs 143 and 144. Accordingly, each of tabs 149 and 150 is perpendicular to a different one of the gimbal axes. Tab 149 includes a substantially rectangular slot 151 for mounting X axis potentiometer 17. Similarly, tab 150 includes a substantially rectangular slot 152 for mounting Y axis potentiometer 18. (It is noted that all of potentiometers 17, 18, 19, and 21 preferably comprise the same component.) An underside view of joystick 10 (with base 44 and lower housing 62 removed) illustrating how the various gimbal assembly components engage upper housing 42 upon assembly is provided in FIG. 9.

Figure 10A:
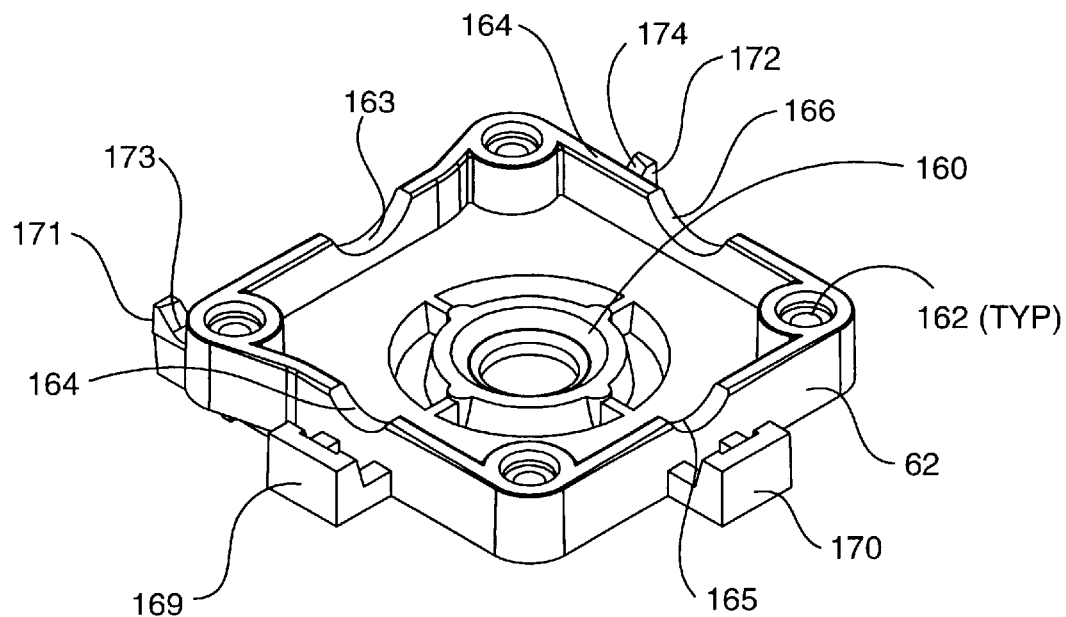
FIGS. 10A and 10B are isometric detail drawings respectively showing a topside and underside of the bottom housing.
Figure 10B:
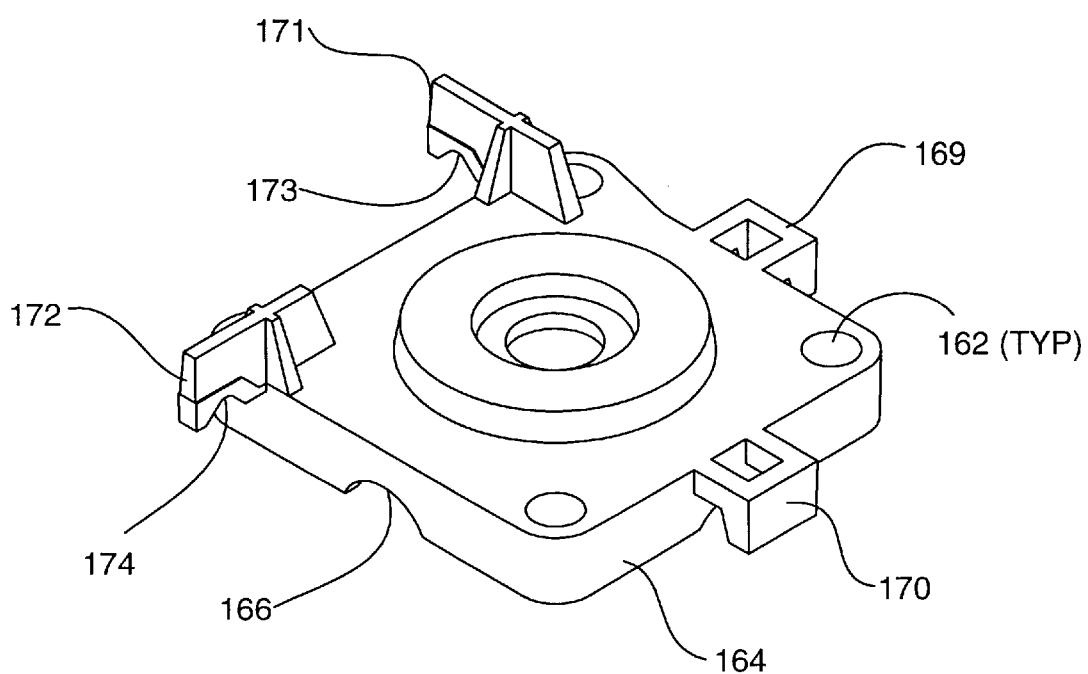

An important feature of the present invention is the ability of the control handle to be pivotally displaced about a center point through which both the X and Y axes pass. Accordingly, upper housing 42 has an opening 154 defined therein through which control handle shaft 12 extends and a lip 156 comprising a spherical surface 158 that is configured to slidingly engage the upper surface of hemispherical member 88. With reference to FIGS. 10A and 10B, bottom housing 62 includes a receiver 160 disposed adjacent to the center thereof that is adapted to slidingly engage the spherical surface of end cap 60. As explained in further detail below, the radii of each of hemispherical member 88 and the spherical surface of end cap 60 are sized such that they share a common center point, which is coincident with center point C, upon assembly of the joystick. As a result, a displacement of the control handle causes control handle shaft 14 to pivot about center point C.

Bottom housing 48 is substantially square in shape, and includes four counterbore clearance holes 162, which are configured so that each of the counterbores receives a cylindrical top potion of a respective boss 144 in the upper housing 42 so as to align clearance holes 162 with receiving holes defined in bosses 144, thereby enabling the bottom housing to be secured to the upper housing with a plurality of threaded fasteners (not shown). Bottom housing 62 also includes a wall portion 164 around a perimeter thereof in which a plurality of bearing surfaces 163, 164, 165, and 166 are defined. These bearing surfaces each include a pair of lower trunnion mounts adapted to mate with the support shafts of the upper and lower gimbals. Upon assembly of the joystick, the lower trunnion mounts are disposed opposite the upper trunnion mounts defined in upper housing 42. Bottom housing 62 further includes tabs 169 and 170, which secure X axis and Y axis potentiometers 17 and 18 in place, and tabs 171 and 172. Tabs 171 and 172 include a slot 173 and a slot 174, respectively.

Upper and lower gimbals 56 and 58 are nested below hemispherical member 88, as shown in FIGS. 2 and 12–14. With reference to FIGS. 1 and 2, a user can impart rotation of the control handle about the X axis by pushing the control handle in forward direction F or pulling the control handle back in reverse direction R. In response to either such action, the control handle pivots about center point C. The location of this center point is more clearly shown in cross-sectional views 13 and 14. Preferably, both the upper and lower gimbal axis pass through this center point. As a result, a more accurate measurement of the angle of rotation results, since the potentiometers directly measure the rotation about the center point with respect to each of the X and Y axes.

Suppose a user moves the control handle to pivot it about center point C so that the only motion occurs about the X axis. As control handle shaft 14 pivots forward, it engages slot 100 in upper gimbal 56, causing support shafts 94 and 96 to be rotated within bearing surfaces 145, 146, 164, and 166 (which collectively form an X axis trunnion mount) so that the upper gimbal pivots about the X axis in a clockwise direction. Since there is no lateral motion of the control handle (i.e. to either the left or right), control handle shaft 14 slides within slot 140 in lower gimbal 58. Accordingly, the angular position (with respect to the Y axis) of gimbal 58 does not change.

As a result of the rotation of upper gimbal 56 about the X axis, the input shaft of X axis potentiometer 17 is turned, causing the resistance measured across the terminals of the potentiometer to change proportionally to the extent of the rotation of the control handle about the X axis. As further explained below, this proportional change in resistance affects an output signal of the joystick.

Figure 11:
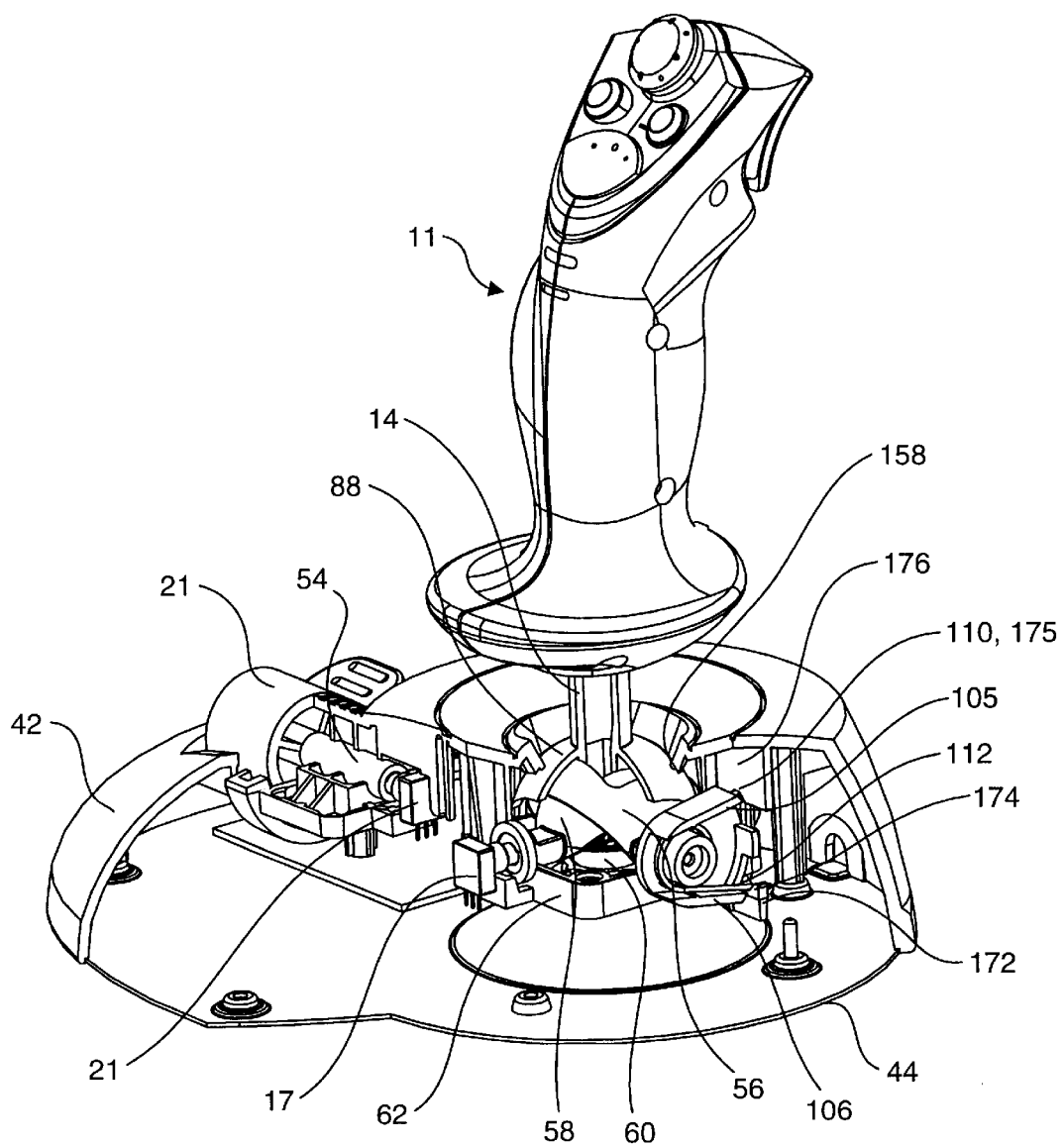
FIG. 11 is a partial cut-away isometric view of the joystick illustrating the gimbal assembly and the action of the bias spring for the X axis.
Figure 12:
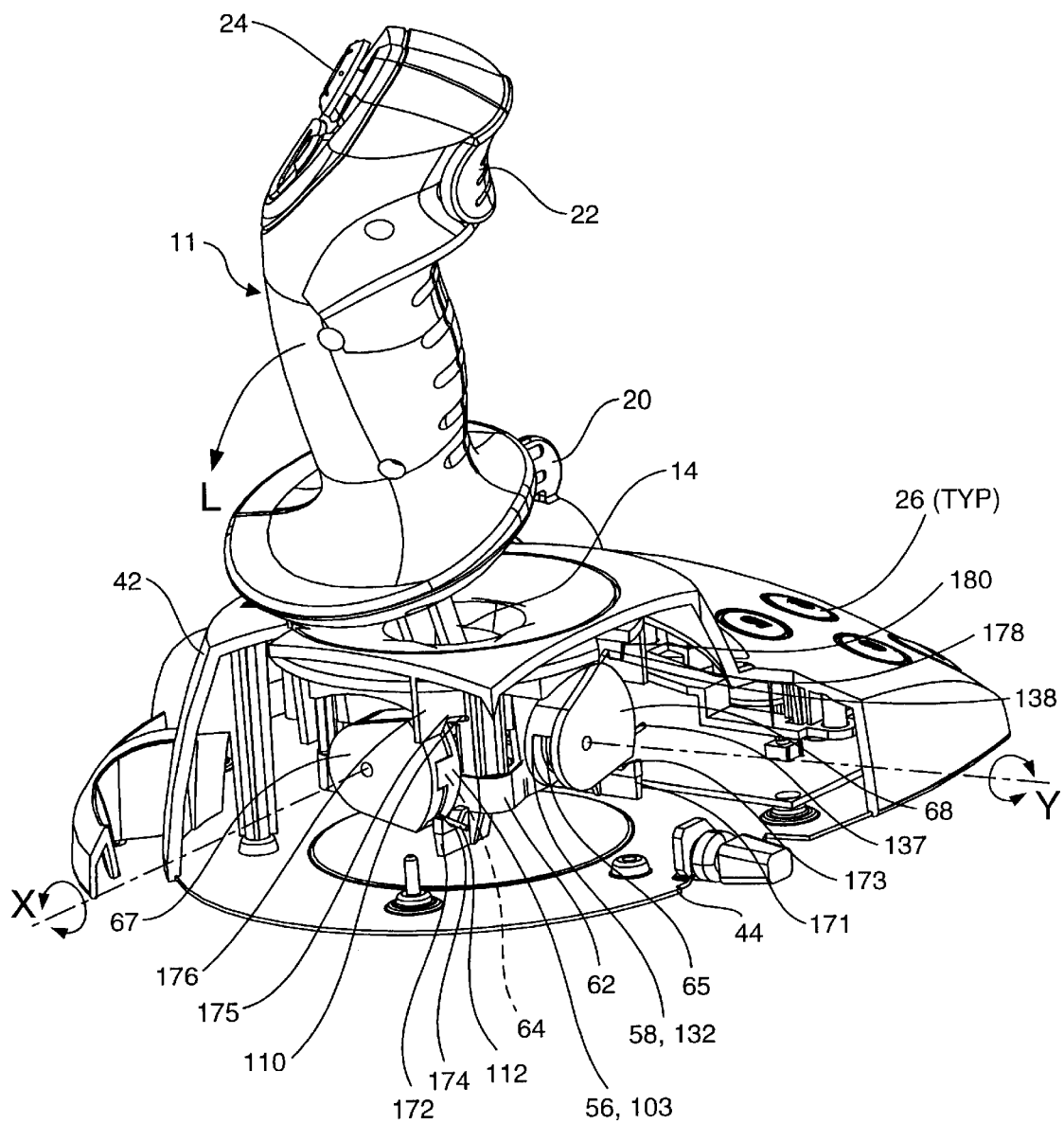
FIG. 12 is a partial cut-away isometric view of the joystick used for illustrating the action of the bias spring for the Y axis.

In addition to rotating the X axis potentiometer, rotation of upper gimbal 56 causes torsion spring holder 103 to rotate. As shown in FIGS. 11 and 12, when upper gimbal 56 is in its normal center position, tangs 110 and 112 of torsion spring 64 respectively engage a slot 175 defined in a tab 176, which extends downwardly from upper housing 42, and slot 174, defined in tab 172, which extends outwardly from lower housing 62. As a result of the engagement of the torsion spring tangs with slots 174 and 175, there is no torque imparted to upper gimbal 56 through torsion spring holder 103 when the control handle is in its center position about the X axis (i.e., no force is applied to the control handle in either the forward or reverse directions). However, as gimbal 56 is rotated in a forward direction, torsion spring holder 103 is rotated clockwise about the X axis, thereby causing tang 110 to engage side wall 105 and to displace the end of tang 112 away from slot 175. However, tang 112 remains engaged with slot 174, causing a separation between tang 112 and side wall 106 (not shown). Furthermore, the distance between the ends of tangs 110 and 112 is decreased, increasing the torsion forces produced by torsion spring 64. As a result, a spring bias force is applied against side wall 105 and slot 174, which creates a torque about the X axis applied to the control handle in opposition of the torque applied to upper gimbal 56 by means of the forward displacement of the control handle by the user. Accordingly, a force is felt by the user in opposition to the forward motion of the control handle, which is approximately proportional to the a amount of its displacement. Furthermore, if the user releases the control handle, the spring bias force causes the control handle to be returned to its centered position about the X axis.

Rotation of the control handle about the X axis by a user in reverse direction R produces a similar, but opposite, result. In this instance, control handle shaft 14 engages slot 100 of upper gimbal 56, causing upper gimbal 56 to rotate about the X axis in a counter-clockwise direction. The input shaft of X axis potentiometer 17 is likewise turned in a counter-clockwise direction in an amount equal to the extent of the rotation of the control handle about the X axis. This rotation of the control handle also causes torsion spring holder 103 to be rotated in a counter-clockwise direction about the X axis. As a result, tang 112 is engaged by side wall 106, causing the end of tang 112 to be displaced away from slot 174. Tang 110 remains engaged with slot 175, causing a torque in the clockwise direction to be produced by the action of tang 112 against side wall 106 and tang 110 against slot 175. Accordingly, a spring bias force is applied to the control handle in opposition of movement of the control handle in the reverse direction, in a manner substantially similar to that discussed above with respect to rotation of the control handle by the user in the forward direction. As with the forward rotation, this spring bias force is proportional to the magnitude of the rotation in the reverse direction about the X axis. Again, when the user releases the control handle, the torque produced by the spring bias force returns the control handle to its centered position about the X axis.

Lateral displacement of the joystick in the left or right directions causes a rotation about the Y axis to be sensed through engagement of control handle shaft 14 with slot 140 in lower gimbal 58. Note, if there is no concurrent forward or reverse motion, control handle shaft 14 slides along slot 140 such that no motion is imparted about the X axis. The action of Y axis potentiometer 18 and torsion spring holder 133 is substantially similar to that discussed above, in regard to rotation of the control handle about the X axis. More specifically, since the input shaft of Y axis potentiometer 18 is coupled to lower gimbal 58 via slot 130, the magnitude of any rotation of the control handle about the Y axis produces a proportional change in resistance across the terminals of the potentiometer. Appropriate signal conditioning and processing circuitry applied to the signal developed by the Y axis potentiometer (described below) enable the extent of the rotation of the control handle about the Y axis to be accurately determined.

In a manner similar to that discussed above with respect to rotation of the control handle about the X axis, displacement of the control handle about the Y axis causes a spring bias force to be generated in a direction opposite that of the displacement. Specifically, rotation of the control handle about the Y axis also pivots lower gimbal 58 about the Y axis, causing torsion spring holder 133 to be rotated, thereby causes torsion spring 65 to produce a torque in opposition to the displacement of the control handle about the Y axis. FIG. 12 shows the control handle centered about the X axis, but maximally displaced to the left (L) about the Y axis. As shown in the Figure, when the control handle is centered about either the X or Y axis, the tangs of the torsion springs for the axis about which it is centered engage slots in upper housing 42 and lower housing 62 such that no torque is generated about the axis. With respect to a centered position of the control handle about the Y axis (not shown), tang 137 of torsion spring 68 engages slot 173 of tab 171, and tang 138 engages a slot 178 defined in a tab 179, which extends downwardly from upper housing 42. Note that when the control handle is displaced about the Y axis (as shown in the Figure), lower gimbal 58 and torsion spring holder 133 are rotated counter-clockwise about the Y axis. As a result, tang 137 is lifted away from slot 173, while tang 138 remains engaged with the slot 178. As a result of this interaction, a spring bias force is produced that opposes the displacement of the control handle about the Y axis and which is approximately proportional to the extent of the displacement. The spring bias force acts to return the control handle to its centered position about the Y axis when a force applied by the user to displace the control handle relative to the Y axis is removed.

Another important aspect of the present invention is that the control handle can be rotated to a maximal displacement about both the X and Y axes, simultaneously. Accordingly, opening 154 has a substantially rectangular shape, with radius corners 159 that are preferably sized to correspond to the radius of control handle shaft 14, as shown in FIG. 8A. This configuration enables a user to move the shaft handle to a maximal position along both the X and Y axes, simultaneously. Additionally, a user can move the control handle about one of the X and Y axes, while the other axis is maintained in a maximally displaced position. This functionality, as well as an increase in the range of each of the X and Y axes (when compared to conventional joysticks) is further facilitated by flats 118 and 120 on the upper gimbal shafts and flats 131 and 132 on the lower gimbal shafts, as well as arcuate reliefs 90, defined by hemispherical member 88 of control handle shaft 14.

Figure 13:
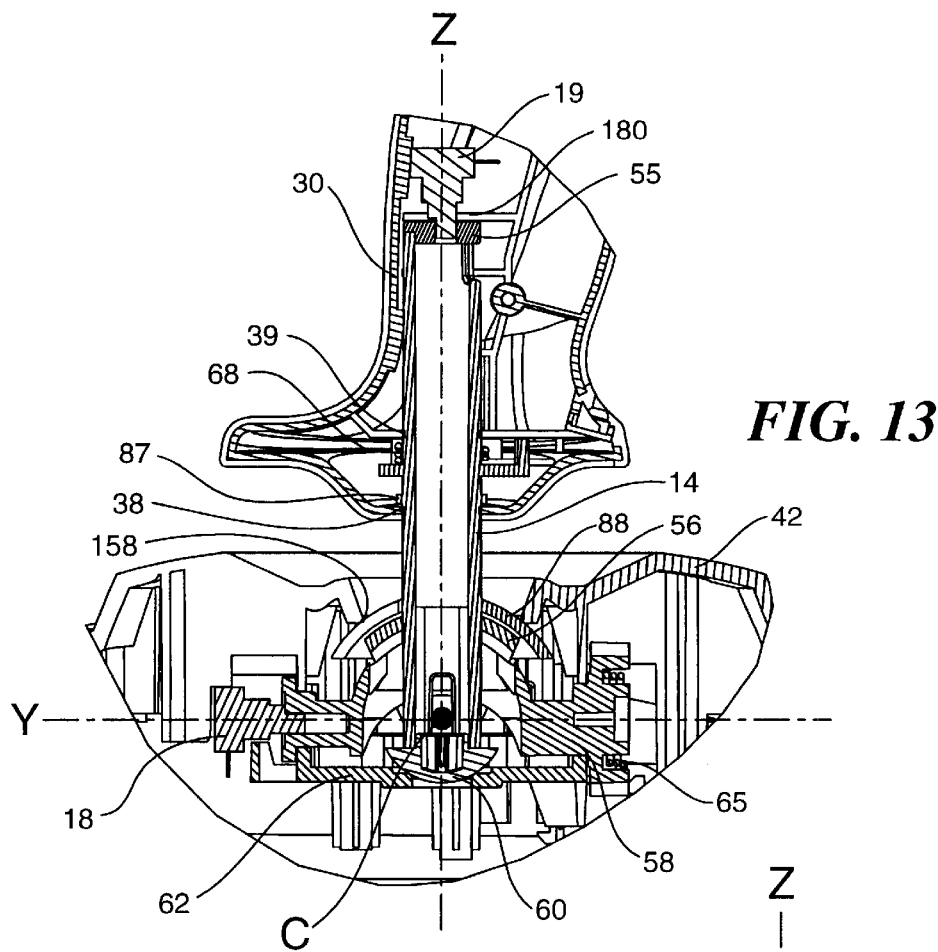
FIG. 13 is a cross-sectional view of the joystick, taken along a section line 13—13 in FIG. 2.
Figure 14:
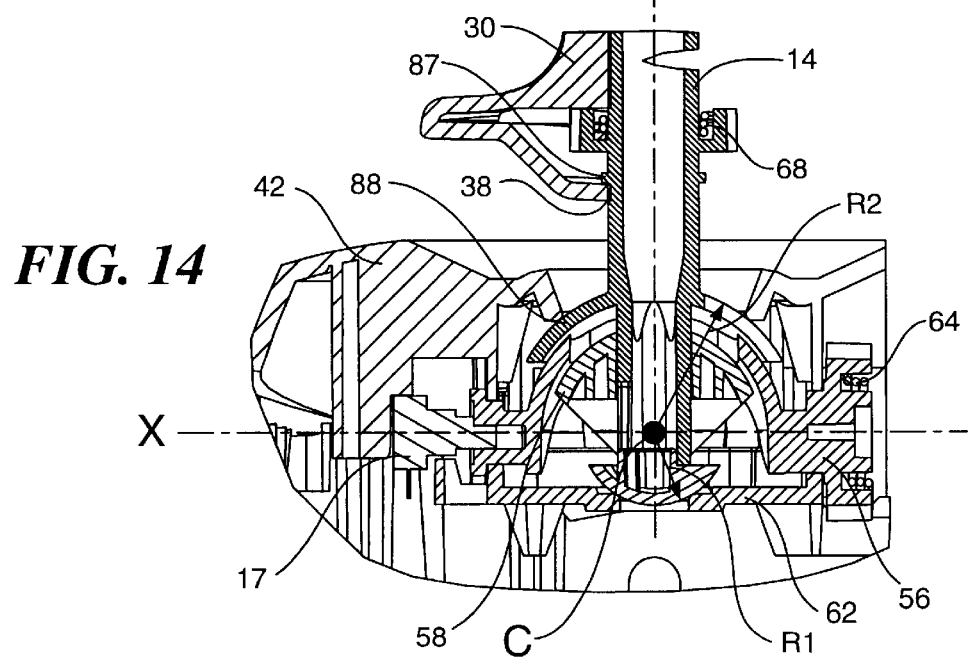
FIG. 14 is a cross-sectional view of the joystick, taken along a section line 14—14 in FIG. 2.

As discussed above, in a preferred form of joystick 10, a user can also provide input control signals by rotating control handle 12 about the Z axis. Upon assembly, upper portion 72 of control handle shaft 14 is encapsulated by left shell 30 and right shell 32 of control handle 12 such that the control handle can be pivoted about the control handle shaft. With reference to FIGS. 4 and 13, control handle 12 is coupled to control handle 14 by vertical engagement of cap 55 with a tab 180 that extends from left shell 30 (and with a similar tab extending from right shell 32 that is not shown), and by vertical engagement between shoulder 87 and a lower edge of bearing surface 38 in both the left and right shells. Accordingly, control handle 12 can be pivoted about control handle shaft 14 (i.e., the Z axis), while the control handle is maintained in engagement with the control handle shaft.

As control handle 12 is rotated about control handle shaft 14, the input shaft of Z axis potentiometer 19 is held fixed in place, while the housing of the potentiometer is caused to rotate about the input shaft, thereby causing the resistance across the terminals of the potentiometer to change in proportion to the extent of the rotational displacement. Accordingly, the extent of such a rotational displacement of the control handle about the Z axis can be determined by appropriately conditioning and processing the signal developed by this potentiometer, thereby producing a corresponding control input signal.

In addition to enabling rotation about the Z axis, joystick 10 provides a spring bias torque that opposes the rotation of the control handle by the user about the Z axis. This torque is produced through interaction of torsion spring holder 78, torsion spring 68, and respective slots 178 defined in left and right shells 30 and 32, in a manner substantially similar to that generated in opposition to rotation of the control handle about the X and Y axes. More specifically, when control handle 12 is rotated about the Z axis, away from its centered position (either clockwise or counter clockwise), the distance between the end of the tangs 81 and 82 of torsion spring 68 is reduced, so that the torsion spring produces a torque about the Z axis opposite to the direction of the rotation of the control about this axis. As with the X and Y axes, the control handle returns to its centered position about the Z axis, when no torque about this axis is applied by the user to control handle 12.

Electronic Components and Control Circuitry

In order to obtain high performance levels, it is often necessary to calibrate a joystick relative to displacement of its control handle about each axis of movement. Typically, the calibration process will involve measuring the output signal produced at the limits of displacement of the control handle about each of the axes (in each direction), and measuring the output signal while in a center position for each axis. After such measurements are taken, a scaling coefficient for each axis can be determined, as well as an offset for the center position of each axis.

Conventional joysticks that are used as input devices for computer games running under Microsoft Corporation's WINDOWS™ operating systems are generally calibrated in the following manner. A user opens up the Control Panel and selects the "game controllers" icon, which launches a dialog containing a list of various input devices that have been previously installed and are presently connected to the system. From this list, the user selects the input device to calibrate and activates a menu option to initiate the calibration process. Another dialog is then launched that includes a graphic display area in which a set of crosshairs corresponding to the output signal produced by the selected input device is displayed. When calibrating a joystick, the user is instructed to displace the control handle a maximal amount to the left. As the joystick is maximally displaced to the left, a plurality of samples of the output signal provided by the joystick is taken, and a limit value corresponding to the maximal displacement of the control handle to the left is determined as a function of these samples (e.g., by averaging the output signals while the control handle is thus displaced). The user is then instructed to displace the control handle a maximal amount to the right, and a similar limit value corresponding to this maximal displacement is determined. Next, the user is instructed to allow the control handle to return to its center position, and additional samples of the input control signal are taken to determine a signal value corresponding to this center position. The user is then instructed to displace the control handle a maximal amount first in the forward direction and followed by the reverse directions, and samples are taken in a manner similar to that discussed above to obtain limit values for this axis. In an alternative scheme (or in addition to), the user may be instructed to displace the control handle a maximal amount about both axes simultaneously in each of the four quadrants to obtain the limit values for these dispositions of the control handle. The process is also repeated for rotation about the Z axis, to determine the limit values for full rotation in each direction.

After the limit values and the center position value for a given axis are determined, a scaling coefficient and center position offset for the axis is determined. The scaling coefficient corresponds to a correction for mechanical rotation range versus the output signal produced by the joystick for that axis and the offset is a correction that is applied to the output signal for errors in the output signal at the center position. For example, when a potentiometer is used as the position measurement device, ideally it is assumed that the output voltage produced by the potentiometer's wiper terminal has a dynamic range equal to that of the mechanical rotation of the potentiometer's input shaft and will be at a value midway between the values for each limit for a given axis. In addition to determining the scaling coefficients and offsets for each axis, a "dead" zone is determined for each axis such that the position of the joystick about that axis will be considered to be in the center position if the output signal falls within the dead zone. A snap-to factor is also applied at the limits in order to guarantee each axis reaches the limit regardless of applying the scaling coefficients and offset corrections.

The scaling coefficients and the offsets for each axis about which the control handle can be moved are written to a calibration data file; or alternatively, a calibration data section of a device driver program that is used with the joystick is modified to include these data. During control of a computer game with the joystick, the output signal produced by the joystick is processed by the device driver program using the scaling coefficients, and offset data so that control input signals passed to the computer program by the device driver program are properly corrected.

The foregoing conventional calibration scheme has several limitations. First, it requires the user to calibrate the joystick in a process that may be subject to error. Second, it requires the resulting calibration data be applied to the signals from the joystick, which requires CPU cycles and may lead to degraded performance, especially on slower computers.

A solution to the calibration problem is to provide a joystick that doesn't need to be calibrated by the user, and which provides output signals to the device driver program (or directly to a hardware level driver) that are already corrected for scaling and offset errors. This function is accomplished in the present invention by determining the limit values for each axis of the joystick at the factory after the A joystick has been manufactured, and storing correction data corresponding to such limit values and center position errors in non-volatile memory included in the joystick so that it is readily accessible. Upon a joystick power-up or reset, the center position offset for each axis is determined, and any change in the scaling correction coefficients for each axis are determined based on changes in the limit values and/or in the center position offset value for that axis. Using the center positions offsets and scaling coefficient corrections, the joystick can provide calibrated control input signals to a gaming application, other application programs, and hardware devices without requiring a device driver program determine the corrected control signals.

Figure 15:
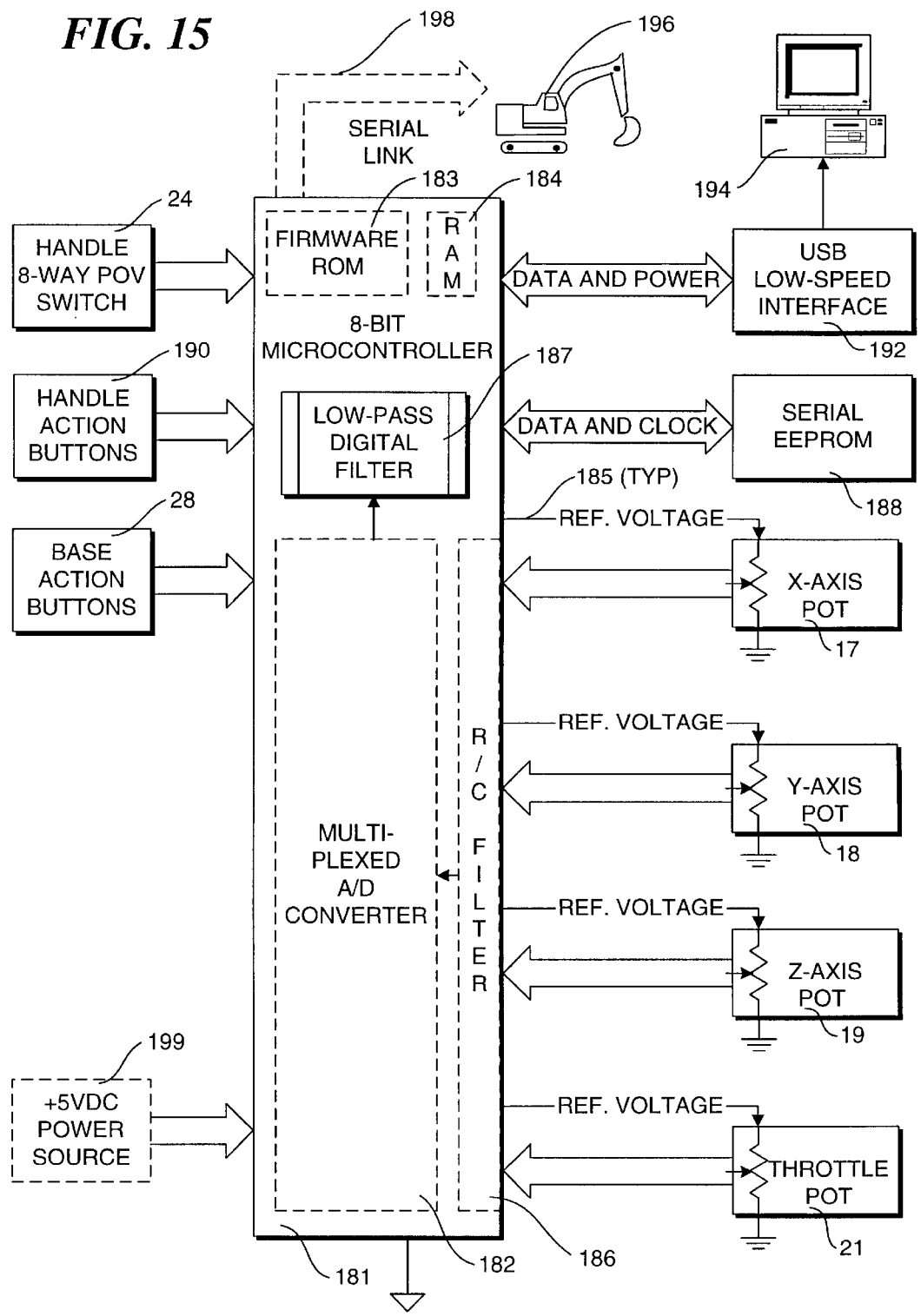
FIG. 15 is an electrical schematic block diagram showing the primary components of the electronic circuitry employed in the joystick.

With reference to FIG. 15, the foregoing functionality is enabled in the present invention through use of an 8-bit microcontroller 181 that is included in joystick 10. The microcontroller includes an embedded, multiplexed analog-to-digital (A/D) converter 182, a ROM (read only memory) 183 in which firmware comprising a plurality of microcode instructions are stored, and RAM (random access memory) 184. A primary function of microcontroller 181 is the measurement, signal conditioning, and processing of analog voltage signals produced by X axis potentiometer 17, Y axis potentiometer 18, Z axis potentiometer 19, and throttle potentiometer 21. Each of these potentiometers is provided with a reference voltage 185, and produces a voltage signal at its wiper terminal having a magnitude that is approximately proportional to the angular position of the potentiometer's input shaft. During calibration and operation of the joystick, the voltage signal at the wiper terminal of each of potentiometers 17, 18, 19 and 21 is passed through an R/C filter 186 and sampled and converted into a corresponding digital signal by A/D converter 182. The resulting digital signals are further filtered by a low-pass digital filter 187, which filters extraneous noise and is enabled, in part, through execution of a portion of the microcode instructions on microcontroller 181. The filtered digital signals are then corrected for scaling and offset errors using calibration data stored in a serial EEPROM 188, and the corrected signals are encoded into a digital composite control signal indicative of the displacement of the control handle about the X axis, Y axis, and Z axis, and indicative of the position of the throttle.

In addition to processing the foregoing input axis signals, microcontroller 181 also senses and processes logical input signals produced by 8-way POV 24, handle trigger switch 22 and control buttons, 25, 26 and 27 (as represented by a block 190), and base action buttons 28, and encodes data corresponding to these logical input signals into the composite control signal. The composite control signal is then transmitted via a USB interface 192 to a computer 194 on which an application program (such as a computer game) that uses the composite control signal is running. USB interface 192 also provides a 5 volt DC power signal to energize microcontroller 181. In cases in which the present invention is implemented for controlling machinery 196, the composite control signal is produced can be transmitted over a serial communication link 198. Furthermore, it is contemplated that a separate power source 199 can optionally be employed to provide power to microcontroller 182, if such power is not provided by the serial communication link.

Figure 16:
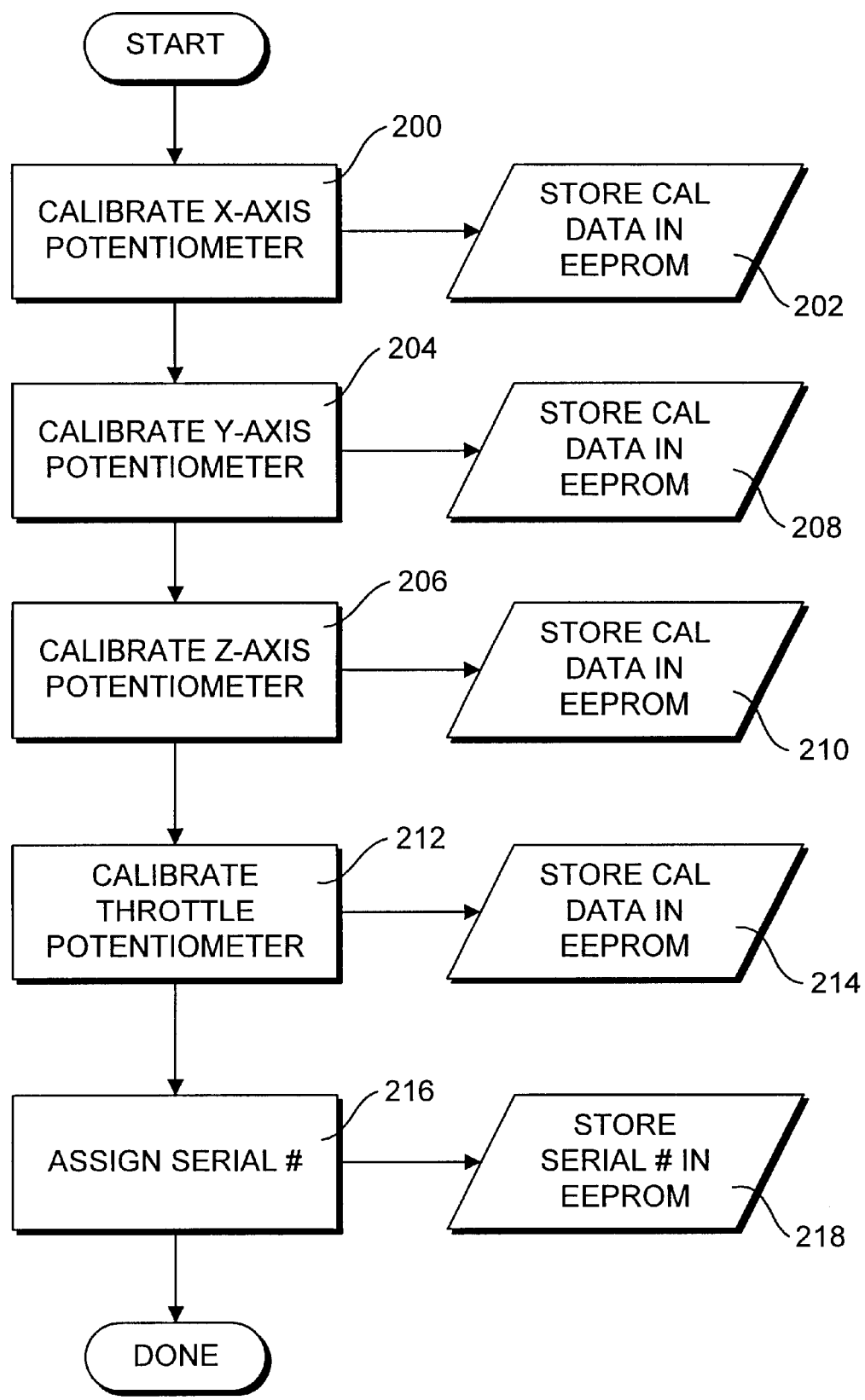
FIG. 16 is a flow chart illustrating steps performed during an initial calibration of the joystick.

With reference to FIG. 16, the various axes of joystick 10 are calibrated in the following manner. (It will be understood that the order of the steps described below has been chosen for convenience and that the particular order used during an actual implementation of these steps is not important. In a preferred implementation, the calibration measurements for the X and Y axis potentiometers are determined concurrently while moving the joystick in a rectangular pattern corresponding to the limits of the device.) In a block 200, X axis potentiometer 17 is calibrated by moving the control handle to maximal forward and reverse displacements about the X axis while sampling the output voltage at the wiper terminal of the X axis potentiometer with A/D converter 182 and filtering the digital signal produced thereby with digital filter 187. A limit value for each of the forward and reverse maximal displacements is determined as a function of the filtered signal at those displacements. The forward and reverse limit values are stored as data 202 in EEPROM 188.

Calibration of Y axis potentiometer 18 and Z axis potentiometer 19, as respectively indicated by blocks 204 and 206, is performed in a manner similar to the calibration of X axis potentiometer 17. During calibration of Y axis potentiometer 18, the output voltage at the wiper terminal of the Y axis potentiometer is sampled and filtered while the control handle is maximally displaced to the left and right. Left and right maximal displacement limit values are determined and stored as data 208 in EEPROM 188. During calibration of Z axis potentiometer 19, the output voltage at the potentiometer's wiper terminal is sampled while the control handle is maximally rotated about the Z axis in the clockwise and counter-clockwise directions. Limit values for the clockwise and counter-clockwise maximal displacements are determined and stored as data 210 in EEPROM 188.

Calibration of throttle potentiometer 21 is similarly performed, as indicated in a block 212. During calibration of the throttle potentiometer, the output voltage at the potentiometer's wiper is sampled and filtered while the throttle is maximally displaced in the forward and reverse directions. Forward (i.e., maximum) and reverse (i.e., minimum) displacement signal limit values are determined and stored as data 212 in EEPROM 188.

In addition to calibrating each of the potentiometers, a unique serial number is assigned to joystick 10 in a block 216, and stored as data 218 in EEPROM 188. During initial detection of joystick 10 through USB interface 192, the identify of the device can be determined by passing the serial number stored in serial EEPROM 188 to the USB interface. This feature is important, as it enables the identification of individual joysticks among a plurality of identical joysticks that share a USB interface connection.

The USB interface enables multiple devices to be connected to a single USB port on the computer or to a port on a USB hub in a daisy chain fashion. These devices will typically include peripherals that serve different functions, such as printers, scanners, portable storage systems, etc. However, there may be instances when it is desired to attach identical gaming controllers, e.g., two or more of joystick 10, to a single USB port. Under normal operation, each joystick 10 is assigned a unique identification and address upon detection of the device by the computer to which the USB port is connected. In instances where two or more identical devices are connected to the same USB port, the identities of the devices may actually be swapped during a subsequent reset, even if no configuration changes have been made to any of the devices sharing the USB port. As a result, particular gaming configurations may change (from a control aspect), even though such a change was not intended. However, by assigning a unique serial number that is accessible by the USB interface to each joystick 10, a particular gaming configuration will always be maintained, as long as the joysticks remain physically configured in the same manner.

As discussed above, joystick 10 produces a composite control signal comprising corrected signals corresponding to each of the X, Y, and Z axes, which have been corrected using the calibration data stored in EEPROM 188. The following describes how the calibration data are used, and describes an optional configuration that enables the calibration data to be updated over the life of the joystick.

With reference to a block 220 in FIG. 17, when joystick 10 is first powered up, or in response to a power-on reset, the joystick is initialized by initializing various input/output functions, timers, and variables. Also, the previously determined calibration data comprising the limit signals of the X, Y, and Z axes potentiometers and the throttle potentiometer (represented as data 220) are loaded from serial EEPROM 188. Next, in a block 224, initial center positions for each of the X, Y, and Z axes are sampled to obtain a center position signal and dead zone for each of these axes, and filter parameters and data buffers are initialized. Upon determining center position signals for each axis, scaling coefficients for those axes are calculated based on the center position signal and the limit signals for each axis. The center position signals and scaling coefficients are then loaded into RAM 184 on microcontroller 181 as calibration data 226.

After the calibration data is loaded into RAM 184, the main process of microcontroller 181 can be initiated and performed, as indicted by blocks 228 and 230. During the main process, the potentiometer signals are measured, filtered, and calibrated on a substantially continuous basis, and various the logic-level signals are sensed and processed. These data, as represented by data 232, are then encoded into a 6-byte digital composite control signal, which is transmitted over USB interface 192 to computer 194 or transmitted over serial link 198 to machinery 196, whereupon the composite control signal is decoded to extract the various individual control signal data.

Calibration of a signal comprises subtracting the center position signal for the signal's axis from the signal and then multiplying the difference by the scaling coefficient to determine a proportional value of the signal with respect to center signal and the limit signals for the axis. Preferably, the proportional control signals for each axis should be calibrated in a manner that produces a full-scale output so that higher control resolution is obtained. For example, with respect to the X axis, suppose that the center position is to produce a null control signal, forward displacements are to produce control signals with positive values, and reverse displacement are to produce control signals with negative values. Accordingly, the minimum value of the control signal (i.e., the value with the highest magnitude in the negative direction) should correspond with a maximal displacement in the reverse direction. Similarly, the maximum value of the control signal should correspond with a maximal displacement in the forward direction. Using an 8-bit signal under this scheme, the minimum signal should be at or near −128, and the maximum signal should be at or near 127.

In an optional configuration, illustrated by the various dashed blocks and arrows, additional steps are added that enable joystick 10 to be automatically recalibrated over the lifetime of the device. As the various joystick, housing, and gimbal components wear, the mechanical limits of the device may change. Additionally, the output voltage characteristics of the potentiometers may also change due to wear. As a result, it is possible that the limit signal values may change over time. For example, in the foregoing full-scale scheme, a potentiometer corresponding to a given axis might produce a full-scale signal prior to reaching a new (due to wear) displacement limit for that axis. As a result, there would be a range near the limit for the axis wherein any motion in the range would no longer be detected. Accordingly, it is desired to adjust the limit signals over the life of the device to compensate for wear so that such a situation does not occur.

Recalibration is performed in the following manner. In a decision block 234, a determination is made as to whether a given potentiometer signal has exceeded one of the maximal displacement limit values for that potentiometer. This evaluation can be performed with every filtered sample, or alternatively, only on a periodic basis, e.g., each time the joystick is initially energized or reset. If a limit value that was stored has not been exceeded, the process returns to block 230 and continues. If a limit value has been exceeded, a new limit value is determined in block 236, and updated calibration data 238 are written to EEPROM 188. In a decision block 240, a determination is made as to whether a calibration command has been requested from the host via the USB interface. If so, the command is processed as explained above and shown in FIG. 16. After the calibration process has terminated, the calibration data is updated in block 224 and stored in EEPROM 188. The process then continues to the start of the main loop in block 228. If a remote calibration was not requested, the process then returns to block 230. Upon the next power-on or reset of the joystick, the new calibration data will be loaded into RAM 184, and used to determine new scaling coefficient corrections applied to correct the voltage signals produced by the potentiometer whose limit value has changed.

There are several substitutions that can be made to the foregoing circuit components while maintaining the overall functionality of the circuit. For example, other types of microcontrollers (e.g., 16-bit, etc.) may be used in place of microcontroller 182, as well as various low-cost microprocessors. Multiplexed A/D converter 182 can be replaced with a multi-channel A/D converter that is embedded within the microcontroller, or can be an external device. Furthermore, low-pass digital filter 187 may be replaced by a discrete device that is specifically designed for high-speed, low-pass filtering, such as various single- and multiple-stage active filters, as is well known in the art.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A joystick, comprising:
   (a) a multi-axis control assembly, including:
      (i) a control handle upon which an input force is applied to pivotally displace the control handle;
      (ii) a control handle shaft extending from an end of the control handle;
      (iii) an end member defining a spherical surface having a first radius about a center point, the end member being coupled to the control handle shaft; and
      (iv) a first hemispherical-shaped shell coupled to the control handle shaft and including a spherical exterior surface having a second radius different than the first radius about the center point;
   (b) a housing that includes:
      (i) a top portion comprising an opening having a bearing surface defined therein that is adapted to slidingly engage the spherical exterior surface of the first hemispherical-shaped shell; and
      (ii) a base portion coupled to said top portion and including a receiver adapted to slidingly engage the spherical surface of the end member;
   (c) a first angular position sensor operatively coupled to the control handle shaft so as to measure a rotation of the control handle about a first axis that extends through the center point; and
   (d) a second angular position sensor operatively coupled to the shaft so as to determine a rotation of the control handle about a second axis that extends through the center point, wherein an input motion applied to the control handle causes the control handle shaft to be pivotally displaced about the center point so as to cause at least one of the angular position sensors to produce an output signal indicative of a direction and an extent of rotation of the control handle.

2. The joystick of claim 1, wherein said first and second axes are orthogonal.

3. The joystick of claim 1, further comprising:
   (a) an upper gimbal pivotally mounted to said housing, comprising a yoke connected at opposing ends to support shafts having a common centerline coincident with the first axis and having a slot defined therein parallel to the first axis through which the control handle shaft extends, said slot being adapted to slidingly engage the control handle shaft, said upper gimbal being operatively coupled to said first angular position sensor; and
   (b) a lower gimbal pivotally mounted to said housing, comprising a yoke connected at opposing ends to support shafts having a common centerline coincident with the second axis and having a slot defined therein parallel to the second axis through which the control handle shaft extends, said slot being adapted to slidingly engage the control handle shaft, said lower gimbal being operatively coupled to said second angular position sensor.

4. The joystick of claim 3, wherein each of the upper and lower gimbals is operatively coupled to corresponding springs that develop a bias force applied against the control handle when the control handle is pivotally displaced away from a center position.

5. The joystick of claim 4, wherein each of said springs comprises a torsion spring including a looped portion having a pair of tangs extending therefrom, each of said torsion springs being disposed in a holder coupled to a respective one of said upper or lower gimbals, said tangs engaging the housing and holder such that rotation of the control handle in either direction about one of said first and second axes causes a distance between the tangs of the torsion spring corresponding to that axis to change such that one of said tangs is caused to exert a force against the housing while the other tang exerts a force against the holder, producing a torque opposing the rotation about said one of the first and second axis and tending to restore the control handle to the center position.

6. The joystick of claim 3, wherein the yoke of the upper gimbal comprises a second hemispherical-shaped shell nested adjacent to the first hemispherical-shaped shell.

7. The joystick of claim 6, wherein the yoke of the lower gimbal comprises an upper surface substantially hemispherical in shape that is nested adjacent to an underside of the yoke of the upper gimbal.

8. The joystick of claim 1, wherein the control handle includes at least one input switch connected to at least one lead wire, and wherein the control handle shaft is hollow, said at least one lead wire extending through the control handle shaft into the housing.

9. The joystick of claim 1, wherein the control handle is rotatably mounted on the control handle shaft so as to be rotatable about a longitudinal axis of the control handle and the control handle shaft, further comprising a third angular position sensor that monitors the rotation of the control handle about said longitudinal axis.

10. The joystick of claim 9, wherein the control handle shaft is coupled with at least one of said upper and lower gimbals so as to prevent rotation of the control handle shaft about its longitudinal axis.

11. The joystick of claim 10, wherein the control handle shaft and the control handle are operatively coupled to a spring that produces a bias torque opposing rotation of the control handle about the longitudinal axis of the control handle shaft, away from a center position.

12. The joystick of claim 1, wherein each of said first axis and said second axis has an associated full range of motion through which the control handle may be rotated between a maximal displacement in each direction about that axis, and wherein the opening defined in the top portion of the housing is substantially rectangular in shape so as to enable the full range of motion about one of said first and second axes while maintaining the maximal displacement of the control handle about the other of said first and second axes.

13. The joystick of claim 12, wherein the first hemispherical-shaped shell comprises a perimeter divided into quadrants, a relief being defined in each quadrant thereof so as to enable the full range of motion about one of said first and second axes while maintaining the maximal displacement of the control handle about the other of the first and second axes.

14. The joystick of claim 1, wherein said first and second angular position sensors respectively comprise a first potentiometer and a second potentiometer, further comprising:
  (a) a memory in which calibration data corresponding to each of said first and second potentiometers are stored; and
  (b) a signal processing circuit electrically connected to each of said first and second potentiometers and said memory, for measuring voltages across each of said first and second potentiometers and producing respective corrected output signals indicative of a pivotal displacement of the control handle about said first and second axes by applying the calibration data to the voltages.

15. A joystick, comprising:
  (a) a multi-axis control assembly, including:
    (i) a control handle upon which an input force is applied to pivotally displace the control handle;
    (ii) a control handle shaft extending from the control handle and having an end defining a spherical surface with a first radius; and
    (iii) a first hemispherical-shaped shell coupled to the control handle shaft comprising a spherical exterior surface with a second radius;
  (b) a housing that includes:
    (i) a top portion comprising an opening, through which the control handle extends, said opening defining a bearing surface adapted to slidingly engage the spherical exterior surface of the hemispherical-shaped member; and
    (ii) a bottom portion coupled to said top portion and comprising a receiver adapted to slidingly engage the spherical surface of the end of the control handle shaft;
  (c) an upper gimbal pivotally mounted to said housing, comprising a yoke connected at opposing ends to respective support shafts having a common centerline defining a first gimbal axis and having a slot defined therein parallel to the first gimbal axis through which the control handle shaft extends, said slot slidingly engaging the control handle shaft;
  (d) a lower gimbal pivotally mounted to said housing, comprising a yoke connected at opposing ends to respective support shafts having a common centerline defining a second gimbal axis and having a slot defined therein parallel to the second gimbal axis through which the control handle shaft extends, said slot slidingly engaging the control handle shaft;
  (e) a first angular position sensor operatively coupled to the upper gimbal so as to monitor a rotation of the control handle about the first gimbal axis; and
  (f) a second angular position sensor operatively coupled to the lower gimbal so as to monitor a rotation of the control handle about the second gimbal axis, wherein an input motion applied to the control handle causes the control handle to be pivotally displaced such that at least one of said upper and lower gimbals is rotated about its respective gimbal axis and at least one of the first and second angular position sensors provides an output signal indicative of a direction and an extent of rotation of the control handle.

16. The joystick of claim 15, wherein said first and second gimbals are disposed such that the first gimbal axis is orthogonal to the second gimble axis.

17. The joystick of claim 15, wherein the first radius and second radius share a substantially common center point such that an input motion applied to the control handle causes the control handle shaft to be pivotally displaced about the common center point.

18. The joystick of claim 17, wherein the upper and lower gimbal axes generally pass through the common center point.

19. The joystick of claim 15, wherein each of the first and second gimbals are pivotally mounted to the housing by a corresponding trunnion bearing mount.

20. The joystick of claim 15, wherein said first and second angular position sensors respectively comprise a first potentiometer and a second potentiometer, further comprising:
  (a) a memory in which calibration data corresponding to each of said first and second potentiometers are stored; and
  (b) a signal processing circuit electrically connected to each of said first and second potentiometers and said memory, for measuring voltages across each of said first and second potentiometers and producing respective corrected output signals indicative of a pivotal displacement of the control handle about said first and second axes by applying the calibration data to the voltages.

21. The joystick of claim 15, wherein each of the upper and lower gimbals is operatively coupled to corresponding springs that develop a bias force applied against the control handle when the control handle is pivotally displaced away from a center position.

22. The joystick of claim 21, wherein each of said springs comprises a torsion spring including a looped portion having a pair of tangs extending therefrom, each of said torsion springs being disposed in a holder coupled to a respective one of said upper or lower gimbals, said tangs engaging the housing and holder such that rotation of the control handle in either direction about one of said first and second gimbal axes causes a distance between the tangs of the torsion spring corresponding to that gimbal axis to change such that one of said tangs exerts a force against the housing while the other tang exerts a force against the holder, producing a torque opposing the rotation of the control handle about said one of the first and second gimbal axes and tending to restore the control handle to the center position.

23. The joystick of claim 15, wherein yoke of the upper gimbal comprises a second hemispherical-shaped shell nested adjacent to the first hemispherical-shaped shell.

24. The joystick of claim 15, wherein the yoke of the lower gimbal comprises an upper surface substantially hemispherical in shape that is nested adjacent to the second hemispherical shell of the upper gimbal.

25. The joystick of claim 15, wherein the control handle comprises at least one input switch connected to at least one lead wire, and wherein the control handle shaft is hollow so as to enable routing of said at least one lead wire through the control handle shaft.

26. The joystick of claim 15, wherein the control handle is rotatably mounted to the control handle shaft so as to be rotatable about a longitudinal axis of the control handle and the control handle shaft, further comprising a third angular position sensor that monitors the rotation of the control handle about said longitudinal axis.

27. The joystick of claim 26, wherein the control handle shaft is coupled with at least one of said upper and lower gimbals so as to prevent rotation of the control handle shaft about its longitudinal axis.

28. The joystick of claim 26, wherein the control handle shaft and control handle are operatively coupled to a spring such that a bias torque is applied against the control handle when the control handle is rotated about the longitudinal axis, away from a center position.

29. The joystick of claim 15, wherein each of said first gimbal axis and said second gimbal axis has an associated full range of motion through which the control handle may be rotated between a maximal displacement in each direction about that axis, and wherein the opening defined in the top portion of the housing is substantially rectangular in shape so as to enable the full range of motion about one of said first and second gimbal axes while maintaining the maximal displacement of the control handle about the other of said first and second gimbal axes.

30. The joystick of claim 29, wherein the first hemispherical-shaped shell comprises a perimeter divided into quadrants, a relief being defined in each quadrant so as to enable the full range of motion about one of said first and second axes while maintaining the maximal displacement of the control handle about the other of the first and second axes.

31. A joystick comprising:
(a) a base, said base comprising a receiver, an upper gimbal and a lower gimbal;
(b) a control handle shaft comprising a longitudinal axis and a spherical end member pivotally coupled to the receiver so as to allow a pivotal displacement of the control handle shaft about a first axis and a second axis, the control handle shaft passing through said upper gimbal and lower gimbal, the gimbals substantially preventing rotation of the control handle shaft about the longitudinal axis;
(c) a control handle upon which an input force is applied to pivotally displace the control handle shaft about the base, said control handle being rotatably coupled to the control handle shaft so as to enable rotation of the control handle about the longitudinal axis; and
(d) an angular position sensor operatively coupled to the control handle so as to measure a rotational displacement of the control handle about the longitudinal axes.

32. The joystick of claim 31, wherein the angular position sensor comprises a potentiometer that is fixedly coupled to one of the control handle and the control handle shaft and includes an input member coupled to the other of the control handle and the control handle shaft.

33. The joystick of claim 31, wherein the control handle and control handle shaft are operatively coupled to a spring that develops a bias force applied against the control handle when the control handle is rotated about the longitudinal axis, away from a center position.

34. The joystick of claim 33, wherein said spring comprises a torsion spring including a looped portion having a pair of tangs extending therefrom, said torsion spring being disposed in a holder coupled to the control handle shaft, said tangs engaging the control handle and the holder such that rotation of the control handle in either direction about the longitudinal axis causes a distance between the tangs to change, one of said tangs then exerting a force against the control handle while the other tang exerts a force against the holder, producing a torque opposing the rotation of the control handle about the longitudinal axis and tending to restore the control handle to the center position.

35. A joystick comprising:
(a) a base;
(b) a control handle pivotally coupled to the base so as to pivotally rotate about at least a first axis and a second axis, wherein for each of said first and second axes, the control handle can be pivotally displaced in opposite directions up to a maximal displacement, and wherein the control handle has a centered position about each of said first and second axis when there is no force applied to the control handle by a user;
(c) a first potentiometer operatively coupled to the joystick and the base so as to produce a voltage output signal that is substantially proportional to a pivotal displacement of the control handle about the first axis;
(d) a second potentiometer operatively coupled to the joystick and the base so as to produce a voltage output signal that is substantially proportional to a pivotal displacement of the control handle about the second axis;
(e) a memory in which calibration data for said first and second potentiometers are stored, wherein the memory stores a plurality of microcode instructions, and said calibration data comprise a pair of limit values for each of said first and second axes derived from the first and second potentiometers when the control handle is pivotally displaced to the maximal displacement in each direction about said first and second axes; and
(f) a signal processing circuit electrically connected to said first and second potentiometers and said memory, said signal processing circuit processing voltages derived from said first and second potentiometers and producing respective corrected signals corresponding to a pivotal displacement of the joystick about said first and second axes by correcting the voltages with the calibration data stored in said memory, wherein execution of said plurality of microcode instructions by the processing circuit enable the joystick to:
(i) determine a center position value for each of said first and second axes when the control handle is in the centered position about each of the first and second axes; and
(ii) determine at least one scaling correction for each of said first and second axes, based on the centered position that is determined for that axis and the limit values for that axis, wherein said center position value and said at least one scaling correction is used to determine a corrected signal for that axis.

36. The joystick of claim 35, wherein the signal processing circuit comprises:
(a) an analog-to-digital converter that receives the voltages derived from said first and second potentiometers and converts said voltages into corresponding digitized signals; and
(b) a processor coupled to the memory and to the analog-to-digital converter to receive said digitized signals, said processor executing said plurality of microcode instructions to convert the digitized signals into the corrected signals.

37. The joystick of claim 36, wherein the processor comprises a microcontroller, and wherein the analog-to-digital converter and memory are embedded in the microcontroller.

38. The joystick of claim 36, wherein the signal processing circuit further comprises a passive filter disposed between each of said first and second potentiometers and said analog-to-digital converter.

39. The joystick of claim 36, wherein the digitized signals include extraneous noise and the signal processing circuit further comprises an active filter disposed between the analog-to-digital converter and the processor, said active filter receiving said digitized signals as an input and filtering said extraneous noise to produce filtered signals that are input to the processor to produce the corrected signals.

40. The joystick of claim 36, wherein execution of said plurality of microcode instructions causes the processor to filter the digitized signals to remove extraneous noise from the digitized signals prior to producing the corrected signals.

41. The joystick of claim 36, wherein execution of said plurality of microcode instructions causes the processor to encode the corrected signals corresponding to each of said first and second axes into a composite control signal that is formatted for transmission over a communication link.

42. The joystick of claim 41, wherein the communication link comprises a Universal Serial Bus interface.

43. The joystick of claim 35, wherein a unique serial number is stored in the memory and is available to a Universal Serial Bus interface to which the joystick is adapted to be connected, so as to uniquely identify the joystick.

44. The joystick of claim 35, wherein the center position value for each of said first and second axes and said at least one scaling correction are automatically performed in response to a power-on reset of the joystick.

45. The joystick of claim 36, wherein execution of said plurality of microcode instructions further causes the processor to:
  (a) monitor the voltages derived from first and second potentiometers in response to a pivotal displacement of the joystick about each of said first and second axes, to determine if the limit values stored in the memory for said first and second axes has been exceeded;
  (b) in response to a determination that a limit value has been exceeded, modifying the calibration data corresponding to that limit value as a function of at least one voltage derived from the potentiometer that was determined to exceed the limit value; and
  (c) storing modified calibration data in said memory.

46. A joystick comprising:
  (a) a control handle shaft comprising a longitudinal axis and a spherical end member;
  (b) a control handle upon which an input force is applied to pivotally displace the control handle shaft, said control handle being rotatably coupled to the control handle shaft so as to enable rotation of the control handle about the longitudinal axis;
  (c) a housing that includes:
    (i) a top portion comprising an opening through which said control handle shaft passes, such that said top portion is displaced by the control handle shaft as the control handle shaft is pivotally displaced, said opening preventing said control handle shaft from freely rotating; and
    (ii) a base portion coupled to said top portion and including a receiver adapted to pivotally engage the spherical surface of the end member; and
  (d) at least one angular position sensor operatively coupled to the control handle so as to measure a rotational displacement of the control handle about the longitudinal axes.

\* \* \* \* \*